(12) United States Patent
Arima et al.

(10) Patent No.: US 11,715,045 B2
(45) Date of Patent: Aug. 1, 2023

(54) LEGAL INFORMATION PROCESSING SYSTEM, METHOD, AND NON-TRANSITORY COMPUTER-READABLE STORAGE MEDIUM STORING PROGRAM

(71) Applicant: HONDA MOTOR CO., LTD., Tokyo (JP)

(72) Inventors: Yuichi Arima, Tokyo (JP); Hidenori Ochiai, Tokyo (JP); Toshihisa Yamaguchi, Tokyo (JP)

(73) Assignee: Honda Motor Co, Ltd., Tokyo (JP)

( * ) Notice: Subject to any disclaimer, the term of this patent is extended or adjusted under 35 U.S.C. 154(b) by 695 days.

(21) Appl. No.: 16/621,900

(22) PCT Filed: Jun. 13, 2018

(86) PCT No.: PCT/JP2018/022634
§ 371 (c)(1),
(2) Date: Dec. 12, 2019

(87) PCT Pub. No.: WO2018/230616
PCT Pub. Date: Dec. 20, 2018

(65) Prior Publication Data
US 2020/0117859 A1    Apr. 16, 2020

(30) Foreign Application Priority Data

Jun. 13, 2017  (JP) ................................ 2017-115824

(51) Int. Cl.
*G06Q 10/04*    (2023.01)
*G06Q 10/0637*  (2023.01)
(Continued)

(52) U.S. Cl.
CPC ....... *G06Q 10/04* (2013.01); *G06Q 10/06375* (2013.01); *G06Q 50/18* (2013.01); *G06F 40/30* (2020.01)

(58) Field of Classification Search
CPC .. G06F 40/30; G06Q 10/06375; G06Q 10/04; G06Q 50/18
(Continued)

(56) References Cited

U.S. PATENT DOCUMENTS

2002/0161733 A1 * 10/2002 Grainger ............ G06Q 50/184
                                                          706/45
2008/0256063 A1   10/2008 Kmasukawa et al.
(Continued)

FOREIGN PATENT DOCUMENTS

CN   101853311 A   10/2010
CN   101853449 A   10/2010
(Continued)

OTHER PUBLICATIONS

PCT/ISA/210 from International Application PCT/JP2018/022634 with the English translation thereof.
(Continued)

*Primary Examiner* — Charles Guiliano
(74) *Attorney, Agent, or Firm* — Carrier, Shende & Associates P.C.; Joseph P. Carrier; Jeffrey T. Gedeon

(57) ABSTRACT

Provided are a legal information processing system, method, and non-transitory computer-readable storage medium storing program which enable the acquisition of useful information anticipating trends in the revision of legislation, regulations, or standards. This legal information processing system sets one or more key persons who are involved in legislation, regulations, or standards, collects at least public information which is created by the key person or in the publication of which the key person is involved, and predicts a trend in the revision of legislation, regulations, standards on the basis of the content of the collected information.

18 Claims, 20 Drawing Sheets

(51) Int. Cl.
*G06Q 50/18* (2012.01)
*G06F 40/30* (2020.01)

(58) Field of Classification Search
USPC ........................................................ 705/7.37
See application file for complete search history.

(56) References Cited

U.S. PATENT DOCUMENTS

| | | | |
|---|---|---|---|
| 2008/0288309 | A1 | 11/2008 | Kmasukawa et al. |
| 2011/0015956 | A1 | 1/2011 | Curd et al. |
| 2017/0308799 | A1* | 10/2017 | Eidelman ............... G06F 40/205 |
| 2017/0308975 | A1 | 10/2017 | Eidelman et al. |
| 2020/0050620 | A1* | 2/2020 | Clark .................... G06F 16/353 |

FOREIGN PATENT DOCUMENTS

| | | |
|---|---|---|
| CN | 106296495 A | 1/2017 |
| CN | 106682150 A | 5/2017 |
| JP | 2004-110149 A | 4/2004 |
| JP | 2008-225579 A | 9/2008 |
| JP | 2008-282222 A | 11/2008 |

OTHER PUBLICATIONS

Yusei Horiuchi of Daiwa Institute of Research, "Civil Law Revision Bill Was Submitted to the Diet", posted on Apr. 3, 2015—Cited in the PCT/ISA/210 from International Application PCT/JP2018/022634.

Aiko Okuno of Mitsubishi UFJ Research and Consulting Co., Ltd., "Perspective and Point on 2015 ISO 14001 Revision", posted on Apr. 4, 2014—Cited in the PCT/ISA/210 from International Application PCT/JP2018/022634.

Extended European search report dated Feb. 18, 2020 issued over the corresponding European Application No. 18816663.1.

Office Action dated Feb. 28, 2023 issued in the corresponding Chinese Patent Application No. 201880039821.2 with the English translation thereof.

* cited by examiner

FIG. 8

| LAW NUMBER TAG | DATE TAG | | CLASSIFICATION TAG | | | LEGAL SYNTAX LEVEL INFORMATION |
|---|---|---|---|---|---|---|
| | REVISION DATE | ENFORCEMENT DATE | CLASSIFICATION 1 | CLASSIFICATION 2 | CLASSIFICATION 3 | |
| AAA1 | 1/BB/201Z | 4/CC/201X | BRAKE APPARATUS | – | – | CONCERNING BRAKE APPARATUSES ⋯ |
| AAA1 | 1/BB/201Z | 4/CC/201X | ACCELERATOR | – | – | CONCERNING ACCELERATORS ⋯ |
| AAA1 | 1/BB/201Z | 4/CC/201X | TIRE | – | – | CONCERNING TIRES ⋯ |
| AAA2 | 2/DD/201Z | 8/EE/201X | MIRROR | – | – | CONCERNING MIRRORS ⋯ |
| ⋮ | ⋮ | ⋮ | ⋮ | ⋮ | ⋮ | ⋮ |

F1

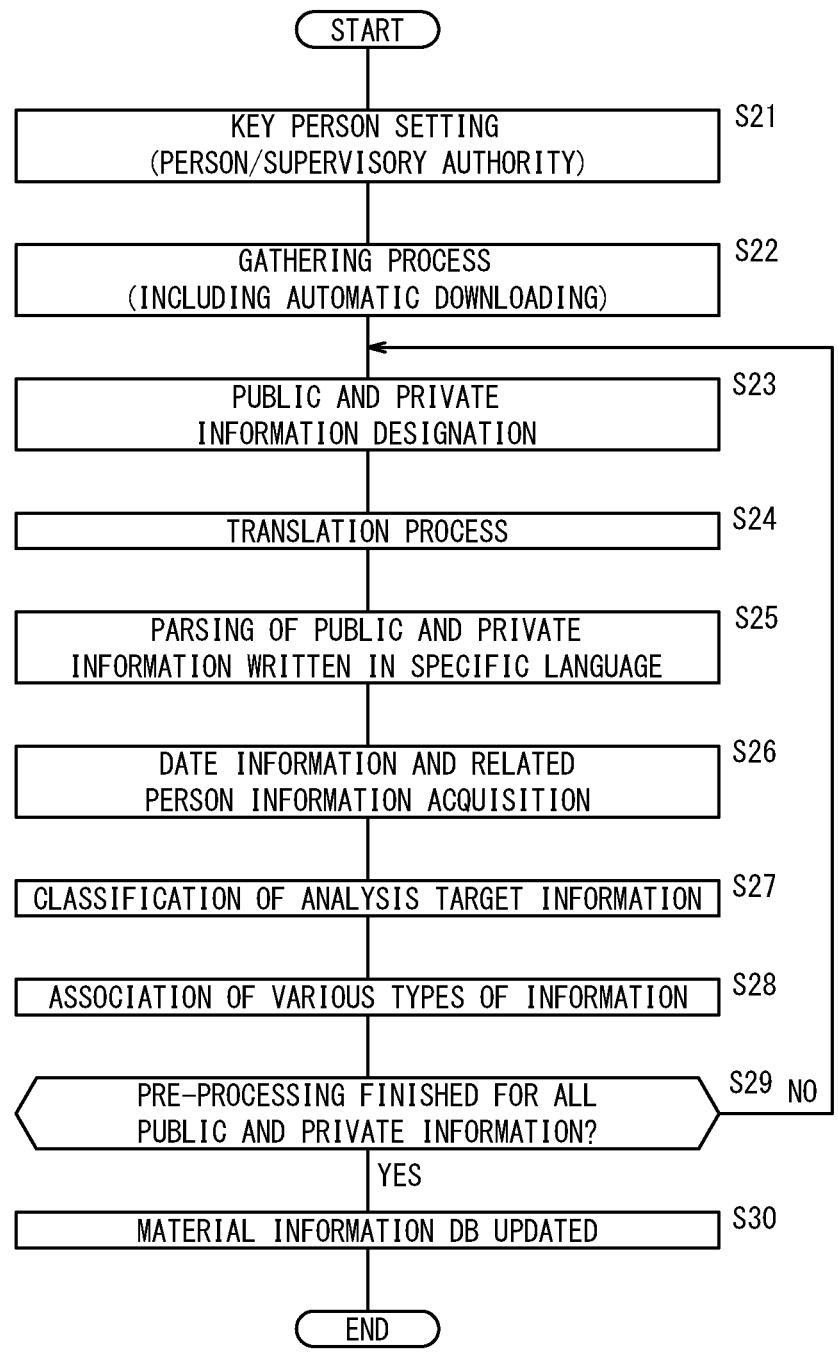

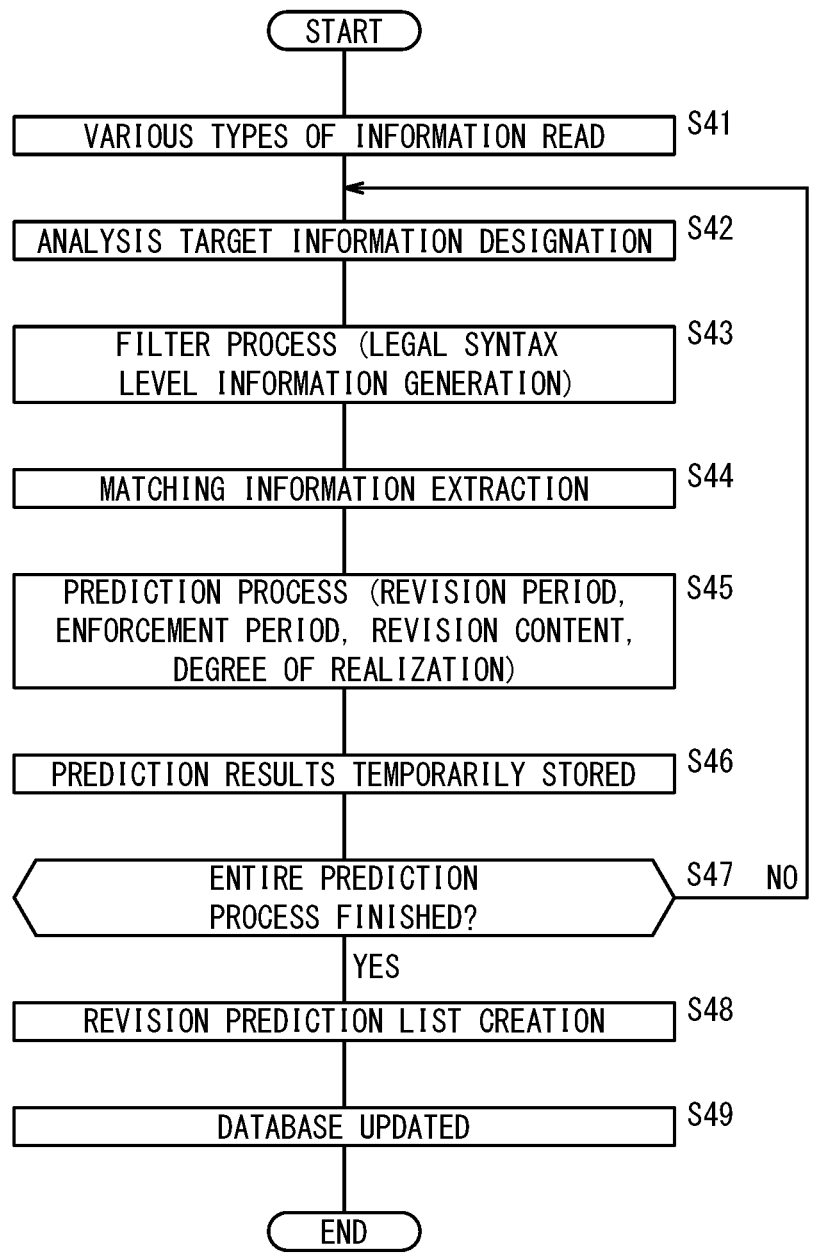

FIG. 15

PROPOSAL BY COMMITTEE ○○ OF HOUSE OF REPRESENTATIVES

PUBLICATION DATE (ACQUISITION DATE)

F4

DEGREE OF REALIZATION

| CLASSIFICATION CATEGORY | TITLE | | REVISION PERIOD | ENFORCEMENT PERIOD | REVISION CONTENT | | STATUS |
|---|---|---|---|---|---|---|---|
| PATENT/RIGHTS HOLDER | REVISION ESTABLISHMENT | MZ/DD/2015 | — | 4/1/2016 | EMPLOYER ATTRIBUTION SYSTEM FOR EMPLOYEE INVENTIONS | 100 | DETERMINED |
| PATENT/RIGHTS HOLDER | | MZ/DD/2015 | 4/2015 – 2016 | 4/2016 – 4/2017 | EMPLOYER ATTRIBUTION SYSTEM FOR EMPLOYEE INVENTIONS | 95 | PREDICTED |
| | ... | ... | ... | ... | ... | ... | ... |
| AUTOMATED DRIVING OF AUTOMOBILE | DELIBERATION RESULT REPORT (AFFIRMATIVE OPINION) OF ○○ COUNCIL, 2016 | 3/2017 | 4/2018 – 3/1/2021 | 4/2019 – 4/2021 | NEXT LAW REVISION PROPOSES TIGHTENING REGULATIONS, MAKING △△ DEVICE MANDATORY FOR ○○ | 70 | PREDICTED |
| AUTOMATED DRIVING OF AUTOMOBILE | ○○ MINISTRY, "2016 ○○ PROMOTION PLAN" | 5/2016 | 2025 – 2028 | 2026 – 2030 | IN 2030, FULLY AUTOMATED AUTOMOBILES WILL APPEAR AND ONLY REQUIRE DRIVER SEAT | 55 | PREDICTED |
| AUTOMATED DRIVING OF AUTOMOBILE | DELIBERATION (NEGATIVE OPINION) OF ○○ COUNCIL, 2016 | 9/2016 | 4/2019 – 3/2022 | 4/2020 – 9/2022 | NEXT LAW REVISION PROPOSES LOOSENING REGULATION SUCH THAT ○○ DEVICE IS NOT NECESSARY FOR STEERING | 10 | PREDICTED |
| | ... | ... | ... | — | ... | ... | ... |
| PRODUCT LIABILITY LAW AND LITIGATION | DELIBERATION RESULT REPORT (ISSUES NOT INCLUDED IN REPORT DRAFT) OF ○○ COUNCIL, 2016 | 3/2017 | | | U.S. "DISCOVERY" SYSTEM IN LITIGATION FOR PRODUCT LIABILITY AND MEDICAL ERRORS | 1 | PREDICTED |
| ... | | | | | | | ... |

| COMPONENT | ID | LAW·REGULATION·STANDARD |
|---|---|---|
| 001 | 001 | LAW1·REGULATION1·STANDARD1 |
| 002 | 001 | LAW1·REGULATION1·STANDARD2 |
| 003 | 001 | LAW1·REGULATION1·STANDARD3 |
| ⋮ | ⋮ | ⋮ |
| 011 | 002 | LAW1·REGULATION2·STANDARD1 |
| 012 | 002 | LAW1·REGULATION2·STANDARD2 |
| 013 | 002 | LAW1·REGULATION2·STANDARD3 |
| ⋮ | ⋮ | ⋮ |
| 101 | 003 | LAW1·REGULATION3·STANDARD1 |
| 102 | 003 | LAW1·REGULATION3·STANDARD2 |
| 103 | 003 | LAW1·REGULATION3·STANDARD3 |
| ⋮ | ⋮ | ⋮ |

| COMPONENT NAME | ID | PUBLICATION DATE (ACQUISITION DATE) | REVISION PERIOD | ENFORCEMENT PERIOD | REVISION CONTENT | DEGREE OF REALIZATION | STATUS |
|---|---|---|---|---|---|---|---|
| 011 | 002 | 3/2017 | 4/2018 – 3/1/2021 | 4/2019 – 4/2021 | NEXT LAW REVISION PROPOSES TIGHTENING REGULATIONS, MAKING △△ DEVICE MANDATORY FOR ○○ | 70 | PREDICTED |
| 101 | 003 | 9/2016 | 4/2019 – 3/2022 | 4/2020 – 9/2022 | NEXT LAW REVISION PROPOSES LOOSENING REGULATION SUCH THAT ○○DEVICE IS NOT NECESSARY FOR STEERING | 10 | PREDICTED |

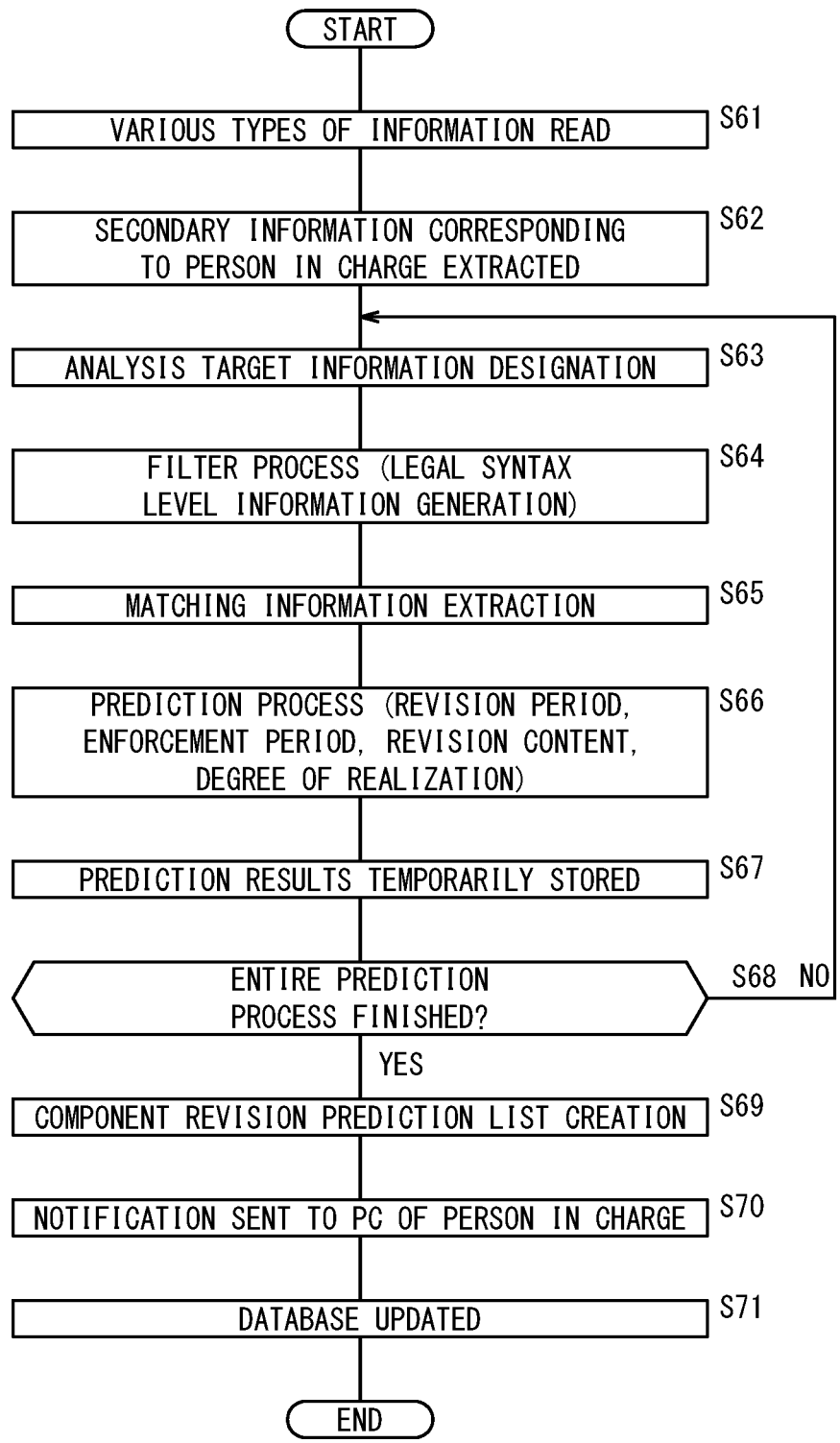

LEGAL INFORMATION PROCESSING SYSTEM, METHOD, AND NON-TRANSITORY COMPUTER-READABLE STORAGE MEDIUM STORING PROGRAM

TECHNICAL FIELD

The present invention relates to a legal information processing system, method, and a non-transitory computer-readable storage medium storing a program that process legal information concerning laws, regulations, or standards.

BACKGROUND ART

There has recently been developed an information processing system for supporting the development of products that comply with laws, regulations, or standards in order to actively and reliably address compliance and risk management.

Japanese Laid-Open Patent Publication No. 2004-110149 proposes a system that references a database in which is accumulated information about laws and regulations concerning the environment or safety of products, and outputs a determination result concerning whether the measured data of a product meets a standard.

SUMMARY OF INVENTION

However, in recent years, amendments to environmental and safety laws have been frequently made not only in Japan, but also in other countries. Therefore, companies (mainly manufacturers) are expected to quickly respond to revisions in the law, and must perform "manufacturing" that reflects these revisions. In particular, in the business field of transportation devices such as automobiles that have become highly sophisticated and complicated in recent years, it is too late to start developing a product according to revised content from the time that an outline of this revision of a law is revealed, and there is a risk that this newly developed product would not be ready in time for the enforcement date of the law. In other words, the idea of companies being able to recognize the beginning of revisions of laws in market countries and develop products according to the market countries at an early stage has been proposed.

On the other hand, it is said that the process of establishing laws, regulations, or standards varies in different countries. For example, a case in which the executive government enacts laws through a process of submitting proposed legislation drafted in advance by bureaucrats in charge to a Diet (e.g. automotive regulations in Japan) and a case where such laws are established by being proposed by legislators belonging to the legislature (so-called legislation by House or Diet members) are given as examples.

In this way, when viewed from the business side, since various enactment processes are envisioned, it is difficult to predict when the legislation/enforcement will take place, and it is even more difficult in countries where legislation by House or Diet is used.

However, the system proposed in Japanese Laid-Open Patent Publication No. 2004-110149 merely accumulates the information of laws and regulations being enacted at the present time, and cannot acquire useful information anticipating trends in the revisions to laws, regulations, or standards.

The present invention has been devised in order to solve this type of problem, and has the object of providing a legal information processing system, method, and a non-transitory computer-readable storage medium storing a program that are capable of acquiring useful information anticipating trends in the revisions to laws, regulations, or standards.

The legal information processing system according to a first aspect of the present invention comprises a key person setting section configured to set one or more key people that are related people related to a law, regulation, or standard; an information gathering section configured to gather at least public information, the key person set by the key person setting section being involved in creating or publishing the public information; and a revision predicting section configured to predict a revision trend of the law, regulation, or standard based on content of the information gathered by the information gathering section.

In a legal information processing method according to a second aspect of the present invention, one or more computers execute a key person setting step of setting one or more key people that are related people related to a law, regulation, or standard; an information gathering step of gathering at least public information, the set key person being involved in creating or publishing the public information; and a predicting step of predicting a revision trend of the law, regulation, or standard based on content of the gathered information.

A legal information processing method according to a third aspect of the present invention comprises a key person setting step of setting one or more key people that are related people related to a law, regulation, or standard; an information gathering step of gathering at least public information, the set key person being involved in creating or publishing the public information; and a predicting step of predicting a revision trend of the law, regulation, or standard based on content of the gathered information, the method, while causing one or more computers to execute the above steps, handling the public information or private information, the one or more ordinary key people or a key person related to product development in his or her own company being involved in creating or publishing the public information or the private information, the legal information processing method comprising an information classifying step of classifying information in prescribed syntax units obtained by parsing the public information or the private information, into each category of the law, regulation, or standard; and a matching information extracting step of extracting matching information indicating matching points or differing points in interpretation between enactment content of the law, regulation, or standard and a development category of a product, the legal information processing method further comprising a step of providing notification about content of a current law, regulation, or standard requiring revision corresponding to a development category of the product, the content being the matching information extracted in the matching information extracting step, in a case where the development category of the product is input as the public information or the private information.

In a legal information processing method according to a fourth aspect of the present invention, one or more computers execute a key person setting step of setting one or more key people that are related people related to a law, regulation, or standard; an information gathering step of gathering at least public information, the set key person being involved in creating or publishing the public information; and a predicting step of predicting a revision trend of the law, regulation, or standard based on content of the gathered information, the information processing method comprising a specific information acquiring step of acquiring date information associated with the information gathered in the information gathering step; and an information classifying step of classifying information in prescribed syntax units obtained by parsing the information, into each category of the law, regulation, or standard, wherein the one or more computers include a legal component comparison database in which, for each component unit of a product regulated by a law, regulation, or standard, a category of the law, regulation, or standard corresponding to the component is assigned, the predicting step includes predicting a revision trend of the law, regulation, or standard for each category into which the information is classified in the information classifying step, by further using the date information acquired in the specific information acquiring step, for the revision trend, at least one of a revision period, an enforcement period, revision content, and a degree of realization is predicted, and for the revision trend, the degree of realization is predicted by further using at least one item from among at least a publication frequency and a number of publications of the public information, a degree of influence of the key person, a domestic or foreign revision history, and a history of handling a revision within a prescribed organization, the legal information processing method further causing the one or more computers to execute a prediction list creating step of selecting prediction results obtained in the predicting step according to the degree of realization and creating a revision predicting list including the revision content having the degree of realization that is relatively high; a component specifying step of, correspondingly to a classification category assigned to the revision content recorded in the revision predicting list, specifying the product and component to be adapted to the revision content by using the legal component comparison database; and a notification step of notifying a person within a company in charge of a component to be adapted to the revision content about at least a revision period, an enforcement period, revision content, and a component to be adapted, based on the history of handling the revision within the prescribed organization.

A non-transitory computer-readable storage medium storing a legal information processing program according to a fifth aspect of the present invention causes one or more computers to execute a key person setting step of setting one or more key people that are related people related to a law, regulation, or standard; an information gathering step of gathering at least public information, the set key person being involved in creating or publishing the public information; and a predicting step of predicting a revision trend of the law, regulation, or standard based on content of the gathered information.

According to the legal information processing system, method, and the non-transitory computer-readable storage medium storing the program of the present invention, it is possible to acquire useful information anticipating trends in the revisions to laws, regulations, or standards.

BRIEF DESCRIPTION OF DRAWINGS

FIG. 8 shows an example of a data structure of the public information F1 (official document) on which pre-processing is performed;

FIG. 9 is a detailed flow chart concerning the gathering process (step S2 of FIG. 5) of public information F2 (private information F3) by the information gathering server;

FIG. 14 is a detailed flow chart concerning a first prediction process (step S4 of FIG. 5) of a revision trend performed by an information processing server;

FIG. 15 visually shows an example of a revision prediction list of FIG. 2;

FIG. 17 visually shows an example of a legal component comparison database;

FIG. 18 visually shows an example of a component revision prediction list;

FIG. 20 is a detailed flow chart concerning a prediction process (step S4 of FIG. 5) of a revision trend performed by the legal information processing system according to the modification.

DESCRIPTION OF EMBODIMENTS

The following provides examples of preferred embodiments for the legal information processing system according to the present invention, in relation to a legal information processing method and a non-transitory computer-readable storage medium storing a legal information processing program, while referencing the accompanying drawings.

[Overall Configuration of the Information Network (Part 1)]

Figure 1:
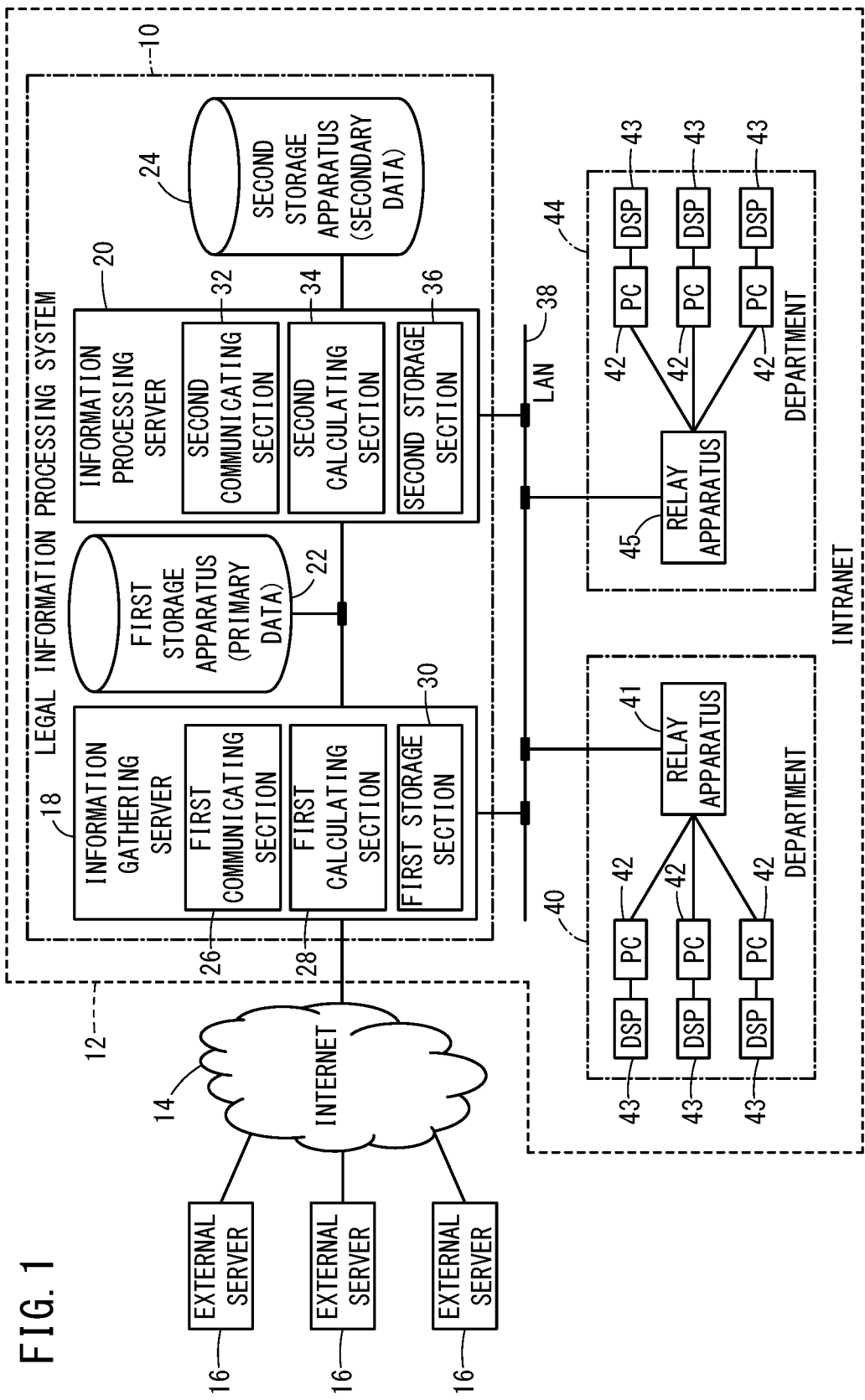
FIG. 1 is an overall configurational diagram of an information network including a legal information processing system according to one embodiment of the present invention.

FIG. 1 is an overall configurational diagram of an information network including a legal information processing system 10 according to one embodiment of the present invention. The legal information processing system 10 is a system that supports certification/regulation-related work (and indirectly, research and development work) by performing desired information processing on information relating to laws, regulations, or standards (also referred to below collectively as "legal information").

As an example, the legal information processing system 10 is formed within an intranet 12 that is operated/managed by an automobile-related manufacturer. Furthermore, the legal information processing system 10 is connected to a plurality of external servers 16 (e.g. web servers and file servers) in a manner enabling bi-directional communication, via the Internet 14.

The external servers 16 are servers managed by external organizations (e.g. universities or research institutions) or internal organizations (e.g. the above-described manufacturer itself or its affiliates). Alternatively, the external servers 16 are servers managed by a party involved with laws, regulations, or standards, such as a national or regional supervisory authority, for example.

Specifically, the legal information processing system 10 is configured to include an information gathering server 18 that gathers at least public information F1 (official documents) and public information F2 (see FIG. 2), an information processing server 20 that applies desired information processing to at least the gathered public information F1 and the public information F2, a first storage apparatus 22 that stores so-called "primary data", and a second storage apparatus 24 that stores so-called "secondary data". The following describes an example in which mainly the public information F1 and the public information F2 are handled, but if necessary, private information F3 held by the company itself or private information F3 obtained independently without using the Internet 14 may be included.

The information gathering server 18 is configured to include a first communicating section 26, a first calculating section 28, and a first storage section 30. The information processing server 20 is configured to include a second communicating section 32, a second calculating section 34, and a second storage section 36.

The first communicating section 26 and the second communicating section 32 are interfaces that transmit and receive electric signals to and from external apparatuses. The first calculating section 28 and the second calculating section 34 are formed of process computing apparatuses including CPUs (Central Processing Units) and MPUs (Micro-Processing Units).

The first storage section 30 and the second storage section 36 are non-transitory and are formed of computer-readable storage mediums. Here, the computer-readable storage mediums are storage apparatuses such as magneto-optical disks, ROMs, CD-ROMs, portable media such as flash memories, and hard disks built into computer systems.

The first storage apparatus 22 is an external storage apparatus capable of constructing a database relating mainly to material information (primary data). The information gathering server 18 is capable of storing data in the first storage apparatus 22 and of reading data from the first storage apparatus 22. The information processing server 20 is capable of storing data in the first storage apparatus 22 and reading data from the first storage apparatus 22.

The second storage apparatus 24 is an external storage apparatus capable of constructing a database relating mainly to processing information (secondary data). The information processing server 20 is capable of storing data in the second storage apparatus 24 and of reading data from the second storage apparatus 24.

The information gathering server 18, the information processing server 20, a relay apparatus 41 of a department 40, and a relay apparatus 45 of a department 44 are connected to each other via a LAN (Local Area Network) 38 established in the intranet 12. Therefore, a PC (Personal Computer) 42 in the department 40 is capable of accessing data stored in the second storage apparatus 24 through the relay apparatus 41, the LAN 38, and the information processing server 20. Furthermore, a PC 42 (terminal) in the department 44 is capable of accessing data stored in the second storage apparatus 24 through the relay apparatus 45, the LAN 38, and the information processing server 20.

[Configuration of the Legal Information Processing System 10]
<Function Block Diagram of the Overall System>

Figure 2:
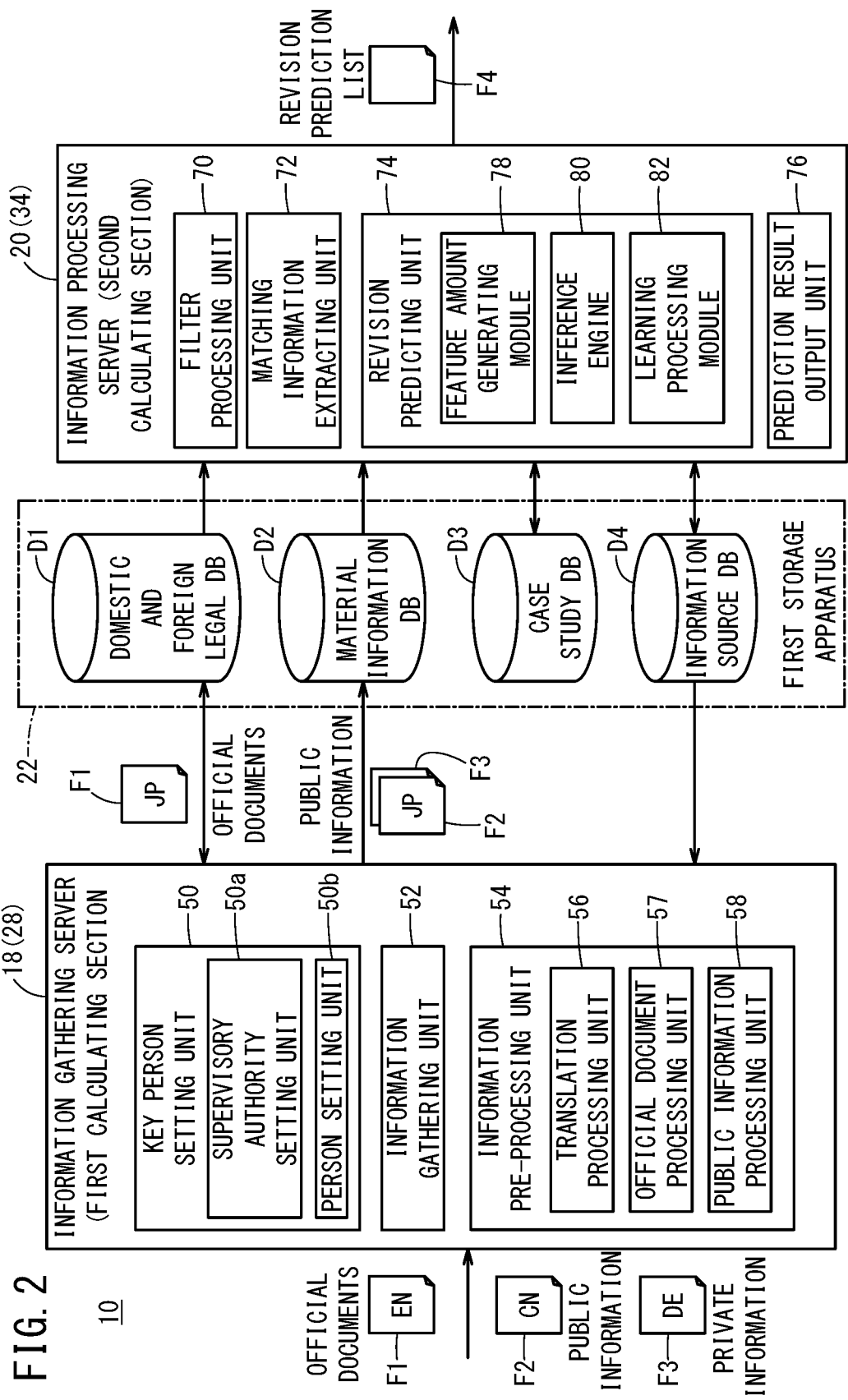
FIG. 2 is a function block diagram of the legal information processing system shown in FIG. 1.

FIG. 2 is a function block diagram of the legal information processing system 10 shown in FIG. 1.

The first calculating section 28 of the information gathering server 18 functions as a key person setting unit 50, an information gathering unit 52, and an information pre-processing unit 54 by reading and executing programs stored in the first storage section 30. Specifically, the key person setting unit 50 includes a supervisory authority setting unit 50a and a person setting unit 50b. Furthermore, the information pre-processing unit 54 includes a translation processing unit 56, an official document processing unit 57, and a public information processing unit 58.

The second calculating section 34 of the information processing server 20 functions as a filter processing unit 70, a matching information extracting unit 72 (matching information extracting section), a revision predicting unit 74 (revision predicting section), and a prediction result output unit 76 (prediction list creating section) by reading and executing programs stored in the second storage section 36.

As an example, four types of databases, which are a domestic and foreign legal database D1, a material information database D2, a case study database D3, and an information source database D4 are constructed in the first storage apparatus 22.

The domestic and foreign legal database D1 is a database that accumulates domestic and foreign (including countries and regions) legal information (e.g. the content of the public information F1 (official documents)). This legal information is recorded using a local official language or a specified language (e.g. Japanese or English), and includes groups of information at a legal syntax level that have been obtained by applying pre-processing to the public information F1 (official documents). Furthermore, this legal information includes not only the most recently enacted content, but also content enacted in the past.

The material information database D2 is a database that accumulates material information indicating the content of the public information F2. It is obvious that, if necessary, the material information indicating the content of the private information F3 may also be accumulated here. This "material information" is an aggregation of analysis target information obtained by applying the pre-processing to the public information F2 and the private information F3, and is associated with date information described further below.

The case study database D3 is a database that accumulates result information of case studies. The cases that are study targets include not only the history of revisions to laws, regulations, or standards implemented in the past domestically and overseas, but also the history of handling a revision within a prescribed organization.

The information source database D4 is a database that accumulates information (referred to below as supervisory authority information) concerning supervisory authorities that are the information sources of the public information F1 (official documents) and information (referred to below as key person information) concerning key people who are the information sources of the public information F2 or the private information F3.

Here, a "supervisory authority" is a concept meaning a government agency that establishes or promulgates laws, regulations, or standards, but may also be a slightly wider concept including an organization that established a standard in a case where a private standard is the de facto standard for the market, and may include not only public institutions but also private individuals. This supervisory authority may be included in the key person described in the following.

A "key person" corresponds to a person who is subjectively considered to have a powerful voice (in other words, large influence) on laws, regulations, or standards, and in short, is a broad concept that includes not only natural people but also public institutions and corporations. The name of the key person includes not only their "name" or "full name" that can be made public on the Internet 14, but also a "pseudonym" capable of specifying a person.

As specific examples, the key person may include the name of a country such as "Japan", the name of a public institution such as "Cabinet Office", the name of a minister such as "Minister of Land, Infrastructure, Transport, and Tourism", the name of a national assembly such as "The House of Representatives of Japan", the name of a local government such as "Kanagawa Prefecture" or "Tokyo", the name of a governor of the local government such as "Governor of Chiba Prefecture" or "Mayor of Osaka", the name of a municipality, and the name of a chairman of the assembly. As other example, the key person includes the name of a researcher, university, or research institution researching the laws or regulations relating to a product at the university or research institution, the name of a researcher, university, research institution, or the like researching standards of the product, or the name of a person who is familiar with the product at the university or research institution, and includes the name of a completed car manufacturer or component manufacturer and the names of engineers who belong to these manufacturers.

As an example, a company that must comply with laws, regulations, or standards or a person (referred to below as a stakeholder) who has a direct or indirect stake in the interests or actions of the supervisory authority in the country or region of such a company can be said to be a party that will be more affected by changes in these laws, regulations, or standards. Specifically, this stakeholder is a consumer (customer), employee, shareholder, creditor, supplier, client, local citizen, national or regional government agency, or the like.

Stakeholders are generally involved in lobbying activities for supervisory authorities, sometimes out of view of the public, and sometimes represent their own corporate position or consumer opinion as a company regulated by a council in a public space, and therefore the stakeholders have a greater influence on the revision of laws, regulations, and standards than ordinary people and are suitable as the key people described above.

<Description of the Information Pre-Processing Unit 54>

Figure 3:
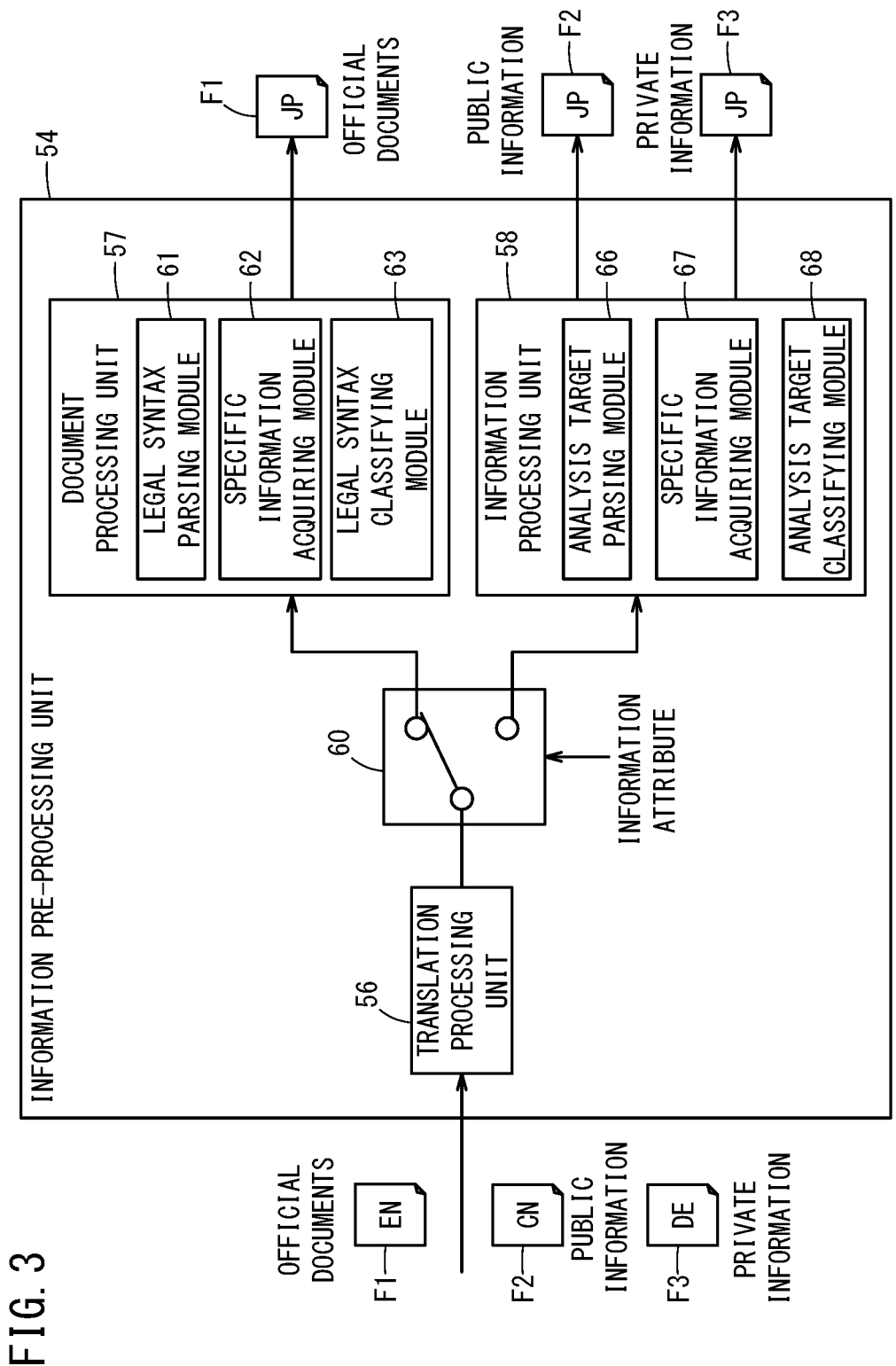
FIG. 3 is a detailed function block diagram of an information pre-processing unit shown in FIG. 2.

FIG. 3 is a detailed function block diagram of the information pre-processing unit 54 shown in FIG. 2. The information pre-processing unit 54 includes, in addition to the translation processing unit 56, the official document processing unit 57, and the public information processing unit 58 described above, a switch 60 provided on the output side of the translation processing unit 56.

The switch 60 is configured to be switchable to either one of the official document processing unit 57 and the public information processing unit 58 according to the input of an information attribute. Here, the "information attribute" means the type of information (specifically the public information F1 (official documents), the public information F2, or the private information F3) that has undergone the translation process by the translation processing unit 56.

The official document processing unit 57 includes a legal syntax parsing module 61, a specific information acquiring module 62, and a legal syntax classifying module 63 (information classifying section). The public information processing unit 58 includes an analysis target parsing module 66, a specific information acquiring module 67 (specific information acquiring section), and an analysis target classifying module 68 (information classifying section).

<Description of the Revision Predicting Unit 74>

Figure 4:
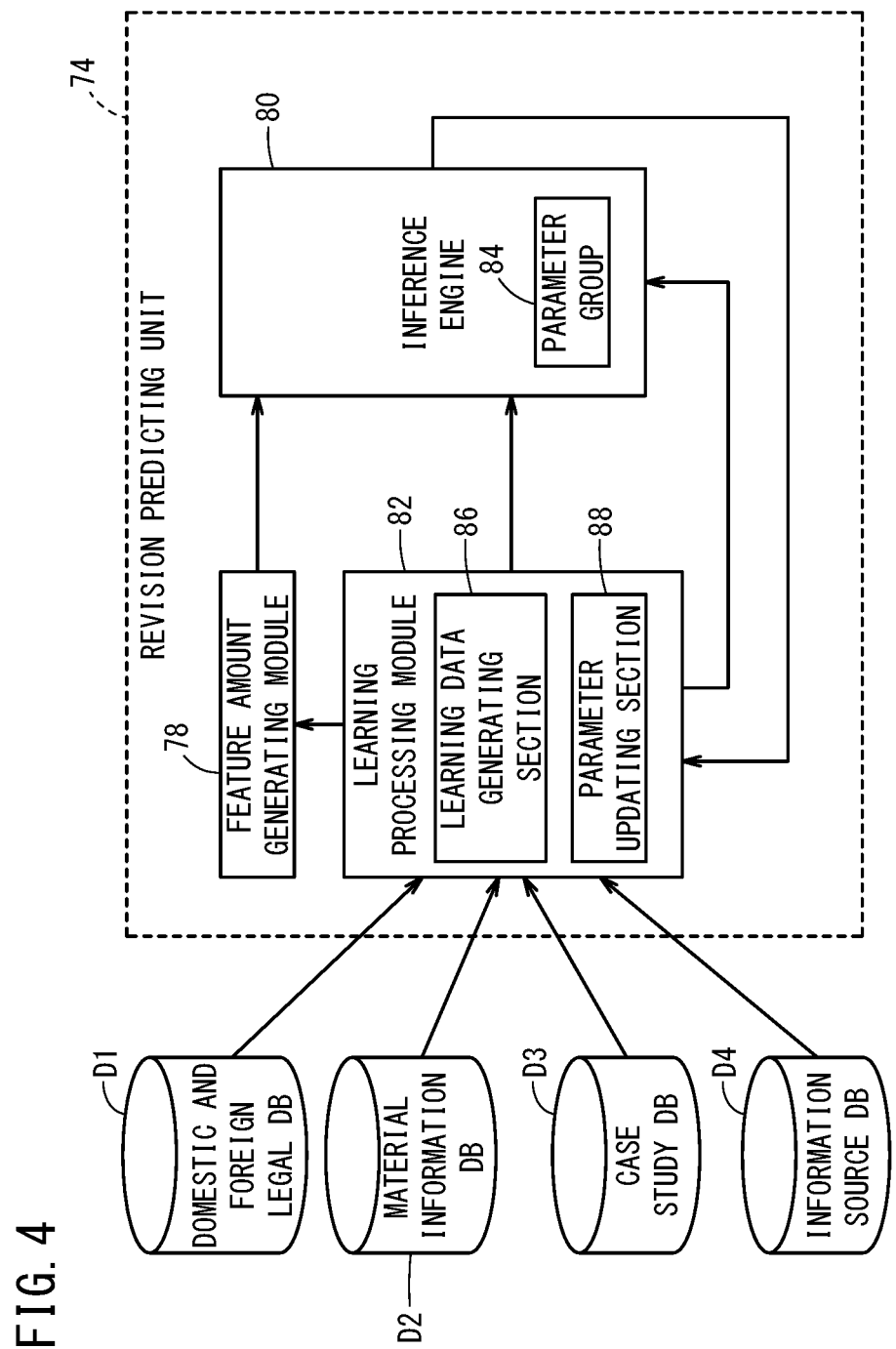
FIG. 4 is a detailed function block diagram of a revision predicting unit shown in FIG. 2.

FIG. 4 is a detailed function block diagram of the revision predicting unit 74 shown in FIG. 2. The revision predicting unit 74 includes a feature amount generating module 78, an inference engine 80, and a learning processing module 82.

The feature amount generating module 78 generates one or more feature amounts to be provided in a learning process or prediction process of the inference engine 80. These feature amounts include revision difficulty, degree of influence, or degree of follow-up, which are described further below with reference to FIG. 11.

After receiving the input of the one or more feature amounts generated by the feature amount generating module 78, the inference engine 80 outputs a revision prediction result in accordance with the calculation rules constructed by the learning process. This inference engine 80 is formed using widely known artificial intelligence technology including neural networks, machine learning, and deep learning, for example. The learning algorithm may adopt any technique from among supervised learning, unsupervised learning, and reinforcement learning.

The calculation rules of the inference engine 80 are determined according to the value of a parameter group 84 that is a set of parameters. This parameter group 84 is stored in the second storage section 36 (see FIG. 1) and is read at a suitable timing as necessary.

The learning processing module 82 controls the learning process of the inference engine 80 and is configured to include a learning data generating section 86 and a parameter updating section 88. The learning data generating section 86 references information read from various databases (e.g. the history of revisions that have actually occurred in the past) and generates learning data to be provided in the learning process. The parameter updating section 88 compares a correct answer (ideal output value) of the learning data with the actual output value of the inference engine 80, and updates each value in the parameter group 84 in a manner to decrease the error of the output value.

[Series of Operations of the Legal Information Processing System 10]

The legal information processing system 10 according to the present embodiment is configured in the manner described above. The following describes a series of operations of the legal information processing system 10, while referencing the flow chart of FIG. 5 in conjunction with FIGS. 6 to 15.

<Step S1: Process of Gathering the Public Information F1 (Official Documents)>

Figure 5:
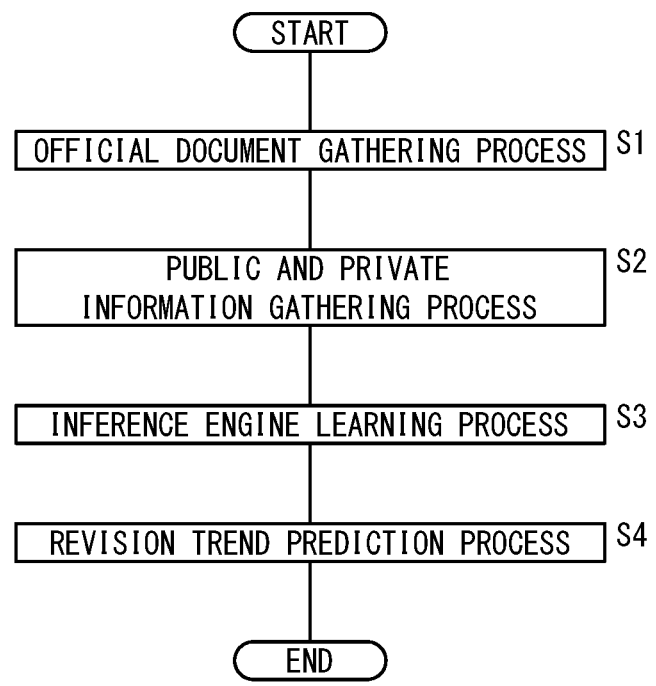
FIG. 5 is a flow chart concerning a series of operations performed by the legal information processing system shown in FIGS. 1 and 2.

At step S1 in FIG. 5, the legal information processing system 10 performs a process of gathering the public information F1 (official documents). Specifically, the information gathering server 18 regularly or irregularly gathers the public information F1 (official documents) on a network. The following describes the details of the gathering operation performed by the information gathering server 18, while referencing the flow chart of FIG. 6 and FIGS. 7 and 8.

Figure 6:
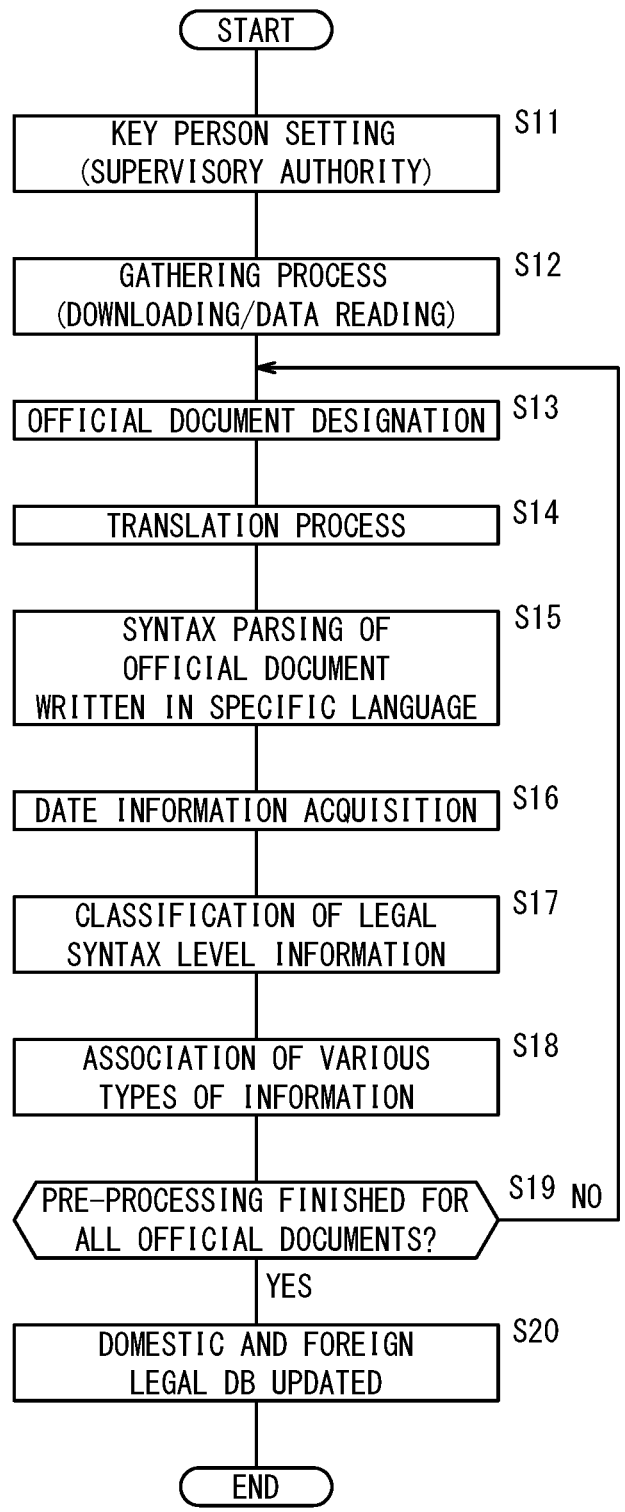
FIG. 6 is a detailed flow chart concerning a gathering process (step S1 of FIG. 5) of public information F1 (official documents) by an information gathering server.

At step S11 in FIG. 6, the key person setting unit 50 sets one or more key people, based on the supervisory authority information acquired from the information source database D4. Specifically, the supervisory authority setting unit 50*a* sets, as a key person, [1] a supervisory authority of a country or region or [2] a company or organization that develops businesses that require compliance with laws, regulations, or standards.

At step S12, the information gathering unit 52 performs the process of gathering the public information F1 (official document), the supervisory authority set at step S11 being involved in publishing and promulgating the public information F1. Specifically, the information gathering unit 52 may access and automatically download address information (e.g. a URL: Uniform Resource Locator) stored in the information source database D4, or may read the public information F1 (official documents) stored in an external information storage medium (not shown in the drawings).

At step S13, if one or more pieces of public information F1 (official documents) are gathered at step S12, the information pre-processing unit 54 designates one piece of public information F1 (official document) that has not yet been pre-processed. At this time, the language in which the public information F1 (official document) is recorded is unclear, and may be English (see "EN" in FIG. 2), for example.

Figure 7:
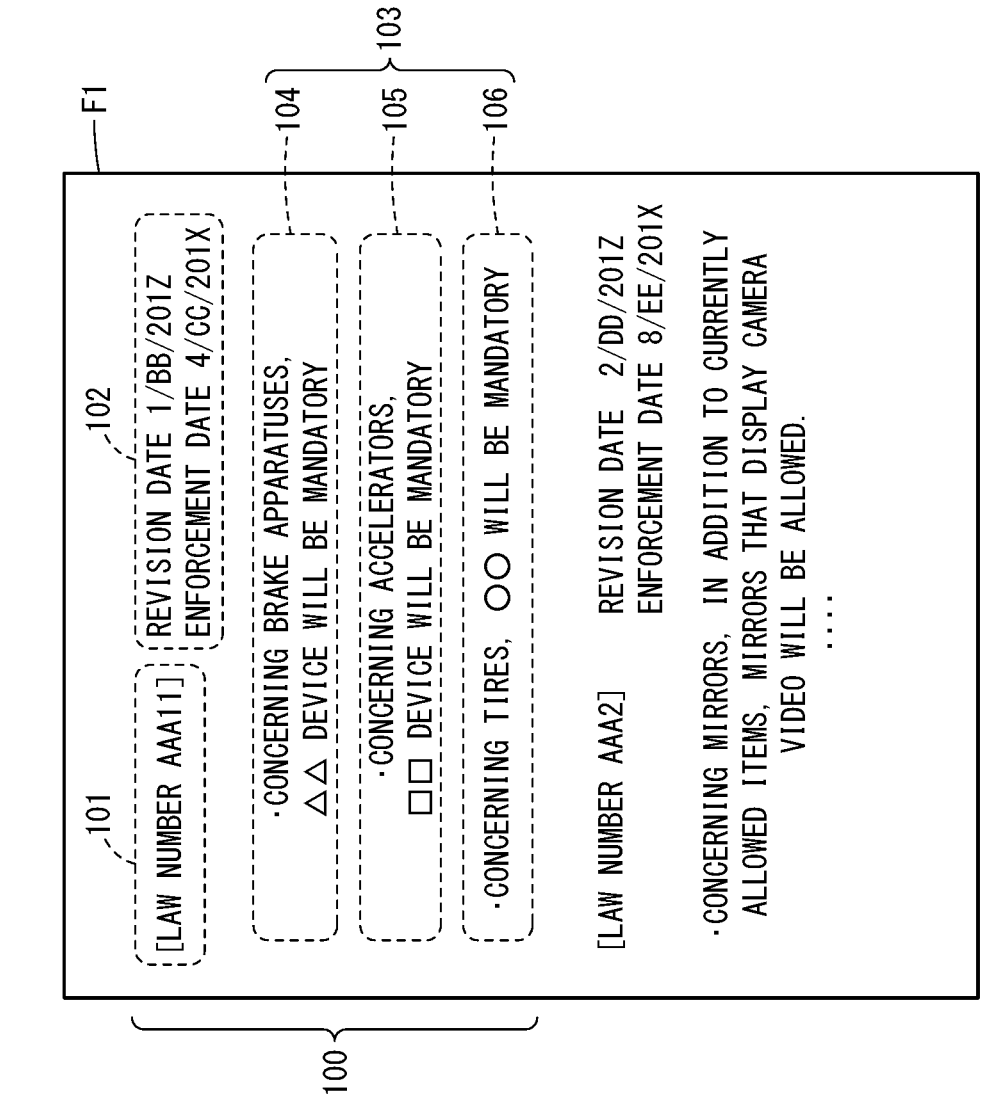
FIG. 7 visually shows an example of the public information F1 (official document) of FIG. 2.

FIG. 7 visually shows an example of the public information F1 (official document) of FIG. 2. The public information F1 (official document) of FIG. 2 is an electronic report recorded in a format in which content 100 of each law number is the basic unit. The content 100 is configured to include a text character string 101 indicating the law number, a text character string 102 indicating the revision date and enforcement date, and a text character string 103 (set of text character strings 104 to 106) indicating the revision content of the law, regulation, or standard.

In this way, there are cases where a plurality of contents 100 are included in one unit of the public information F1 (official document) and various revision content is included in one unit of the content 100.

At step S14, the translation processing unit 56 performs the translation process to translate the public information F1 (official document) designated at step S13 into a specific language (e.g. Japanese or English) capable of being used in the information processing from step S15 and onward. Before this translation, the translation processing unit 56 may extract, from within the public information F1 (official document), information (referred to below as non-text information) that is not recorded in text characters, and perform the translation process after converting this non-text information into corresponding text characters.

At step S15, the legal syntax parsing module 61 parses the public information F1 (official document), which has been translated into the specific language at step S14, into information in prescribed syntax units (referred to below as legal syntax level information) using any syntax analysis technique.

In the example of FIG. 7, after parsing the public information F1 (official document) into the respective contents 100, the legal syntax parsing module 61 further subdivides the content of the contents 100. In this way, the contents 100 are categorized respectively as the text character strings 101, 102, and 104 to 106. Each of the text character strings 104 to 106 corresponds to the legal syntax level information described above.

At step S16, the specific information acquiring module 62 acquires date information associated with the public information F1 (official document) designated at step S13. Specifically, the specific information acquiring module 62 acquires the enforcement date, promulgation date, revision date, and the like associated with each piece of legal syntax level information, by analyzing the contents 100 parsed at step S15.

In the example of FIG. 7, the specific information acquiring module 62 performs the analysis by extracting, from the subdivided contents 100, the text character string 102 including the characters (e.g. year, month, day, or numbers) or symbols (e.g. slashes, hyphens, or commas) indicating a date. In this way, the revision date (1/BB/201Z) and the enforcement date (4/CC/201X) are acquired.

At step S17, the legal syntax classifying module 63 classifies the pieces of legal syntax level information parsed at step S15 into each category of a law, regulation, or standard, according to preset classification rules. Specifically, the legal syntax classifying module 63 performs a classification process that assigns a highly relevant "category tag" to each piece of legal syntax level information.

These categories (referred to below as classification categories) may include, for example, [1] a [regional classification] such as Japan, the U.S., China, or Europe, [2] a [functional classification] such as safety, environment, electromagnetic compatibility, or chemical substance, and [3] a [structural classification] (component classification) such as a body, engine, or tire. Furthermore, there are cases where two or more classification categories are provided at the same time to one piece of legal syntax level information other than a case where one classification category is provided to one piece of legal syntax level information.

In the example of FIG. 7, the legal syntax classifying module 63 analyzes whether there is a character string that matches or resembles the name (e.g. body, engine, or tire) of a classification category within the text character strings 104 to 106, which are pieces of legal syntax level information, and assigns the corresponding category tag if such a character string is present. In this way, the text character string 104 is classified as a "brake apparatus", the text character string 105 is classified as an "accelerator", and the text character string 106 is classified as a "tire".

At step S18, the official document processing unit 57 performs a process to associate the pieces of legal syntax level information classified into each category at step S17 with the various types of information including the date information.

In the example of FIG. 7, the official document processing unit 57 associates a common law number, revision date, and enforcement date with the plurality of pieces of legal syntax level information (text character strings 104 to 106) included in one unit of the content 100. Furthermore, the official document processing unit 57 associates a common supervisory authority with all of the pieces of legal syntax level information included in one unit of the public information F1 (official document).

At step S19, the information pre-processing unit 54 determines whether the pre-processing has been finished for all of the public information F1 (official documents) gathered at step S12. If the pre-processing has not yet been finished (step S19: NO), the process returns to step S13, and another piece of public information F1 (official document) that has not yet been processed is designated, and then the pre-processing continues while steps S13 to S18 are repeated. On the other hand, if the entire pre-processing has been finished (step S19: YES), the process moves to step S20.

FIG. 8 shows an example of a data structure of the public information F1 (official document) on which the pre-processing is performed. More specifically, this drawing shows table data corresponding to a partial collection of configurational units (records) of the domestic and foreign legal database D1. This public information F1 (official document) is configured to include a law number tag, a date tag (revision date and enforcement date), a classification tag, and legal syntax level information.

At step S20, after compiling the legal syntax level information associated at step S18, the information gathering server 18 (first calculating section 28) transmits this information to the first storage apparatus 22 via the first communicating section 26. After receiving this legal syntax level information, the first storage apparatus 22 updates the domestic and foreign legal database D1. In this way, the information gathering server 18 completes the operation of gathering the public information F1 (official documents).

<Step S2: Process of Gathering the Public Information F2 or Private Information F3>

At step S2 in FIG. 5, the legal information processing system 10 performs the process of gathering the public information F2. Specifically, the information gathering server 18 regularly or irregularly gathers the public information F2 on a network. Furthermore, if necessary, the information gathering server 18 regularly or irregularly gathers private information F3 held by its own company or private information F3 obtained independently without using the Internet 14. The following describes the details of the gathering operation performed by the information gathering server 18, while referencing the flow chart of FIG. 9 and FIG. 10.

At step S21 of FIG. 9, the key person setting unit 50 sets one or more key people, based on the key person information acquired from the information source database D4. Specifically, the person setting unit 50*b* sets, as a key person, [1] a legal authority on laws, regulations, or standards, [2] a company or organization (or an employee or staff member thereof) that develops businesses that require compliance with laws, regulations, or standards, or [3] a supervisory authority of a country or region.

In particular, the key person setting unit 50 may set a stakeholder who has a stake in a law, regulation, or standard as a related person. This is because a stakeholder has a greater influence on revisions than an ordinary related person, and is therefore suitable as a key person.

At step S22, the information gathering unit 52 regularly or irregularly performs gathering (e.g. automatic downloading) of the public information F2 on the Internet 14, the key person set at step S21 being involved in creating or publishing the public information F2. Furthermore, if necessary, the information gathering unit 52 regularly or irregularly gathers the private information F3. The public information F2 or the private information F3 are not limited to text characters in various languages, and may also be any data format including images, video, and audio. The access destination in the external server 16 (see FIG. 1) is specified by address information including a URL stored in the information source database D4, for example.

For example, information usable by an electronic public notice of the supervisory authority is one form of public information F2 that is important for understanding the revision trends through the establishment history of laws, regulations, or standards in a country or region. Furthermore, documents published under the patent system or a similar system are one form of public information F2 that is important for understanding the revision trends through disclosed technological problems.

At step S23, if one or more pieces of the public information F2 or of the private information F3 have been gathered at step S22, the information pre-processing unit 54 designates one piece of the public information F2 or one piece of the private information F3 that has not yet been pre-processed. At this time, the language in which the public information F2 is recorded is unclear, and may be Chinese (see "CN" in FIG. 2), for example. Further, the language in which the public information F3 is recorded is unclear, and may be German (see "DE" in FIG. 2), for example.

Figure 10:
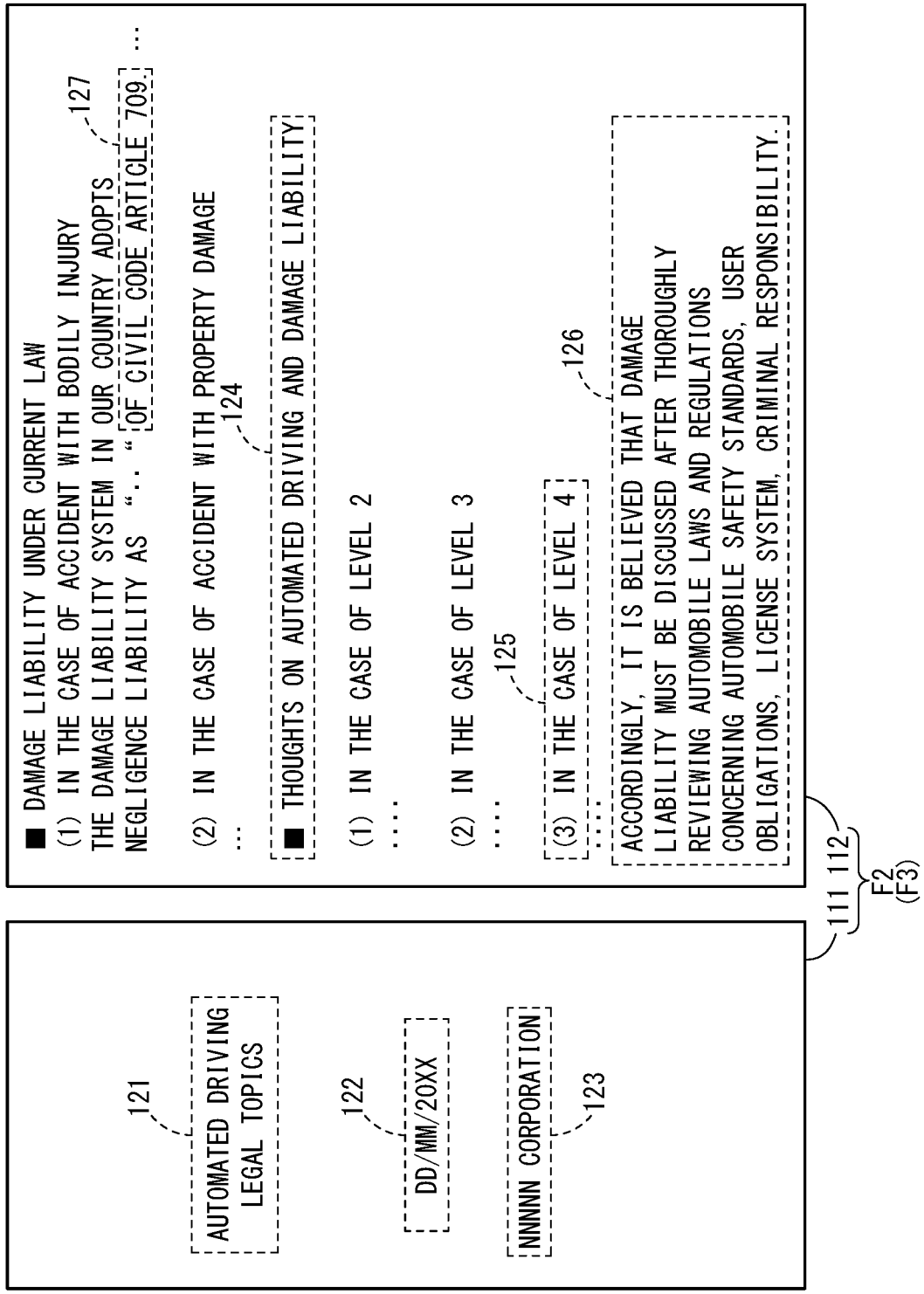
FIG. 10 visually shows an example of the public information F2 (private information F3) of FIG. 2.

FIG. 10 visually shows an example of the public information F2 of FIG. 2. This public information F2 is an electronic report made up of a plurality of pages and, in the example of the present drawing, is only a two-page report expressed by arranging a page (left side) showing bibliographic information 111 and a page (right side) showing report content 112. The bibliographic information 111 is configured to include a text character string 121 indicating the title of the report, a text character string 122 indicating an issuance date, and a text character string 123 indicating an issuer. The private information F3 may have a similar configuration.

At step S24, the translation processing unit 56 performs the translation process to translate the public information F2 or the private information F3 designated at step S23 into a specific language that can be used in the information processing from step S25 and onward. In the same manner as in the case of step S14 (FIG. 6), the translation processing unit 56 may extract the non-text information from the public information F2 or the private information F3 and perform the translation process after converting this non-text information into corresponding text characters.

Alternatively, the translation processing unit 56 may convert "image data" or "video frames" that are non-text information into text characters, by performing image processing including character recognition processing. Furthermore, the translation processing unit 56 may convert "audio data" that is non-text information into text characters, by performing signal processing including voice recognition processing.

At step S25, the analysis target parsing module 66 uses any syntax analyzing technique to parse and reconstruct the public information F2 or the private information F3 translated into the specific language at step S24, and generates information in prescribed syntax units (referred to below as analysis target information).

In the example of FIG. 10, after distinguishing between the bibliographic information 111 and the report content 112 and recognizing the sentence structure of the report content 112, the analysis target parsing module 66 generates one or more pieces of analysis target information by parsing and reconstructing the report content 112 according to prescribed rules. In this way, for example, analysis target information is obtained in which a text character string 124 indicating a heading (thoughts on autonomous driving and damage liability), a text character string 125 indicating a category (a case of level 4), and a text character string 126 indicating detailed content are joined together. The configurational unit of the text character string 126 may be any one of a sentence, a paragraph, a chapter, a page, or an article.

At step S26, the specific information acquiring module 67 acquires the date information associated with the public information F2 or the private information F3 designated at step S23. For example, the specific information acquiring module 67 may acquire, as the date information, the date within a web page containing the public information F2 or the creation date or update date of the public information F2. For the private information F3, the acquisition date may be acquired as the date information. Furthermore, the specific information acquiring module 67 may acquire date information contained in the bibliographic information 111 or the report content 112 by analyzing the public information F2 or the private information F3.

In the example of FIG. 10, the specific information acquiring module 67 performs an analysis by extracting the text character string 122 including the characters (e.g. year, month, day, or numbers) or symbols (e.g. slashes, hyphens, or commas) indicating a date from the bibliographic information 111. In this way, the issuance date (MM/DD/20XX) is acquired.

Furthermore, the specific information acquiring module 67 may acquire information (referred to below as related person information) capable of specifying a related person associated with the public information F2 or the private information F3, together with or separately from the date information. In this case, the key person setting unit 50 newly sets, as a key person, the related person specified by the related person information, separately from the key person who has been involved in creating or publishing the public information F2 or the private information F3 (step S21). In this way, it is possible to automatically compensate for missing key person settings.

At step S27, the analysis target classifying module 68 classifies the analysis target information generated at step S25 into each category of a law, regulation, or standard, according to preset classification rules. Specifically, the analysis target classifying module 68 performs a classification process assigning a highly relevant "category tag" to each piece of analysis target information.

This classification process uses a process that is the same as or different from the process used in the case of step S17 (FIG. 6). For example, if the text character string 126 does not explicitly include a legal basis, the analysis target classifying module 68 may estimate a corresponding classification category from the relationship with a text character string 127 (Civil Code Article 709) that is near the text character string 126.

At step S28, the public information processing unit 58 performs a process to associate the analysis target information classified into each category at step S27 with the various types of information including the date information. Here, examples of the various types of information include, in addition to the date information, a title, creator, issuer, law information (law name and article number), and key person information.

At step S29, the information pre-processing unit 54 determines whether the pre-processing has been finished for all of the public information F2 and private information F3 gathered at step S22. If the pre-processing has not yet been finished (step S29: NO), the process returns to step S23, and another piece of public information F2 or private information F3 that has not yet been processed is designated, and then the pre-processing continues while steps S23 to S29 are repeated. On the other hand, if the entire pre-processing has been finished (step S29: YES), the process moves to step S30.

At step S30, after compiling the analysis target information associated at step S28, the information gathering server 18 (first calculating section 28) transmits this information to the first storage apparatus 22 via the first communicating section 26. After receiving this analysis target information, the first storage apparatus 22 updates the material information database D2. In this way, the information gathering server 18 completes the operation of gathering the public information F2 and private information F3.

<Step S3: Learning Process of the Inference Engine 80>

At step S3 in FIG. 5, the legal information processing system 10 performs the learning process of the inference engine 80. Specifically, the information processing server 20 performs the learning process of the inference engine 80 regularly or irregularly. The following describes the details of the learning process performed by the information processing server 20, while referencing FIGS. 11 to 13.

Figure 11:
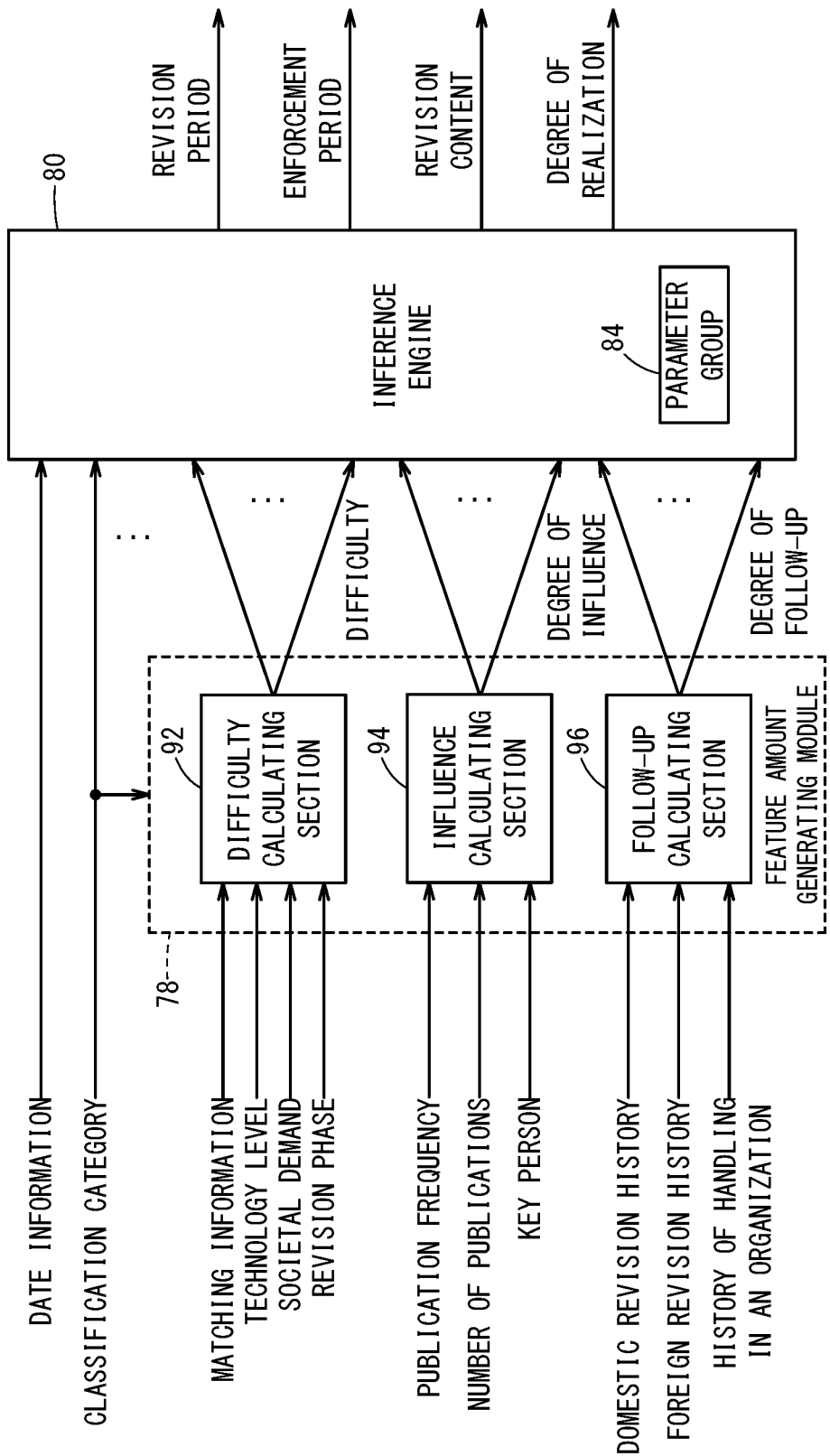
FIG. 11 shows a design example of input/output parameters in an inference engine of FIG. 4.

FIG. 11 shows a design example of input/output parameters in the inference engine 80 of FIG. 4. In the example of FIG. 4, only the main components of the revision predicting unit 74, specifically the feature amount generating module 78, the inference engine 80, and the input/output parameters of the inference engine 80, are shown.

The feature amount generating module 78 is configured to include a difficulty calculating section 92 that quantifies the difficulty of a revision based on the current societal situation, an influence calculating section 94 that quantifies a degree of influence on a revision based on the power of the voice of a related person, and a follow-up calculating section 96 that quantifies a degree of follow-up to a revision based on the history of the societal situation.

The input parameters of the inference engine 80 are not limited to a combination of the difficulty, degree of influence, and degree of follow-up described above, and may include other indicators combining these features, or indicators separate from these features. For example, the difficulty may be either one of a degree of difficulty or a degree of ease, and may use an indicator obtained as the product of the degree of realization and degree of ease.

The difficulty calculating section 92 outputs at least one type of feature amount indicating the difficulty of the revision, based on input parameters including, for example, matching information, a current technology level, a societal demand for revision, and a revision phase that are described later, in addition to the classification category of the legal syntax level information.

Examples of the "technology level" include recorded content such as "technically difficult", "technical problems are still piling up", "practical application is still further away", and "innovation is expected in the future". If such recorded content is included in the legal syntax level information, a calculation result indicating that the technology level is relatively low (the difficulty is relatively high) is obtained.

Examples of the "societal demand" include recorded content such as "early practical application is desired", "legal development is progressing", and "international conformity is necessary". If such recorded content is included in the legal syntax level information, a calculation result indicating that the societal demand is relatively high (the difficulty is relatively low) is obtained.

Examples of the "revision phase" include the types of organizations involved in legislation and the state of deliberation. In a case where deliberation is taking place in an organization downstream in the legislation, a calculation result indicating that the possibility of establishing the revision is relatively high (the difficulty is relatively low) is obtained. In a case where deliberation by an origination with a strong voice has not yet been completed, a calculation result indicating that the possibility of establishing the revision is relatively low (the difficulty is relatively high) is obtained.

The influence calculating section 94 outputs at least one type of feature amount indicating the degree of influence on the revision, based on input parameters including the frequency of publication or number of publications of the public information F2 or a key person, for example, in addition to the classification category of the legal syntax level information. A calculation result indicating that the degree of influence on the revision is relatively high is obtained for a higher publication frequency, a higher number of publications, or a stronger voice of the key person. For the private information F3, at least one type of feature amount indicating the degree of influence on the revision is output based on input parameters including a key person. A calculation result indicating that the degree of influence on the revision is relatively high is obtained for a stronger voice of the key person.

The follow-up calculating section 96 outputs at least one type of feature amount indicating a degree of follow-up to the revision, based on input parameters including the domestic or foreign revision history or the history of handling a revision within a prescribed organization, in addition to the classification category of the legal syntax level information.

Examples of the "domestic revision history" include a relationship between the schedule of the council and study groups hosted by the supervisory authority and the revision schedule, and the revision trend of countries adopting legislation systems such as a bicameral system legislation by members. Furthermore, examples of the "history of handling" include example cases of successful or unsuccessful decision making in the past concerning revisions.

Examples of "foreign revision history" include, in the automotive industry, a trend in which the state of California in the U.S. is the first in the world to introduce strict regulations but the U.S. federal government is late in adopting equivalent regulations (typically shown by the case of the "Muskie Act"). In the same manner as such a relationship, there is an example in which advanced countries adopt some of the regulations enacted by the state of California in the U.S. but developing countries adopt equivalent regulations later than advanced countries.

After receiving the input of one or more feature amounts generated by the feature amount generating module 78, in addition to the date information and the classification category, the inference engine 80 outputs a revision period, an enforcement period, revision content, and degree of realization, which are pieces of useful information for business activities including research and development, according to calculation results constructed by the learning process.

The calculation rules of the inference engine 80 are determined according to values of the parameter group 84 that are a set of parameters. If the inference engine 80 is constructed using a layered neural network, the parameter group 84 may include a coefficient specifying a neuron response function, a synaptic connection weighting coefficient, the number of intermediate layers, and the number of neurons forming each layer.

Figure 12:
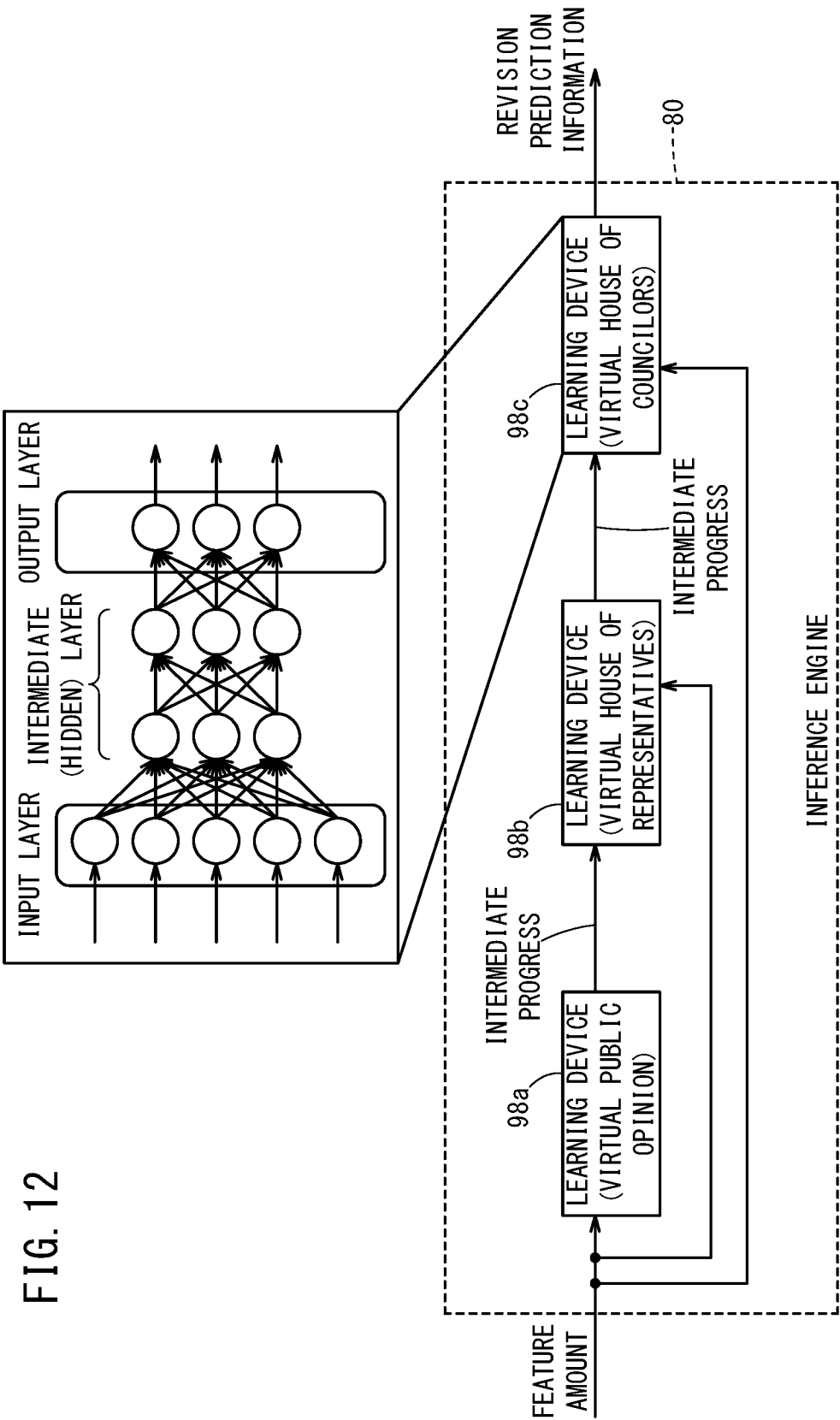
FIG. 12 shows an example of a construction of the inference engine of FIG. 11.

FIG. 12 shows an example of the construction of the inference engine 80 of FIG. 11. This inference engine 80 is a predictive system that simulates organizational structure involved in legislation, and includes a plurality of learning devices (three learning devices 98a, 98b, and 98c in the stated order from the upstream side) connected in series. For example, the learning device 98a corresponds to a "virtual public opinion" obtained by simulating public opinion, the learning device 98b corresponds to a "virtual House of Representatives" obtained by simulating the House of Representatives (Lower House), and the learning device 98c corresponds to a "virtual House of Councilors" simulating the House of Councilors (Upper House).

In other words, the revision predicting unit 74 includes the plurality of learning devices 98a to 98c simulating organizations involved in laws, regulations, and standards, and simulates the organizational structure involved in the laws, regulations, and standards.

Each of the learning devices 98a to 98c is a multilayer perceptron formed of an input layer, at least one intermediate layer (or hidden layer), and an output layer. Here, for each of the learning devices 98a to 98c, the number of neurons (circle marks in the drawing), the number of intermediate layers, the definitions of input parameters, or the definitions of output parameters may be changed as desired.

It should be noted that, according to the Japanese legislative procedure, after a bill has been passed in the House of Representatives, a "Law Draft" at the time of deliberation by the House of Councilors is deliberated by the committee. After being passed by the House of Representatives, the bill basically continues as-is, but there is a possibility of this bill being struck down or having alterations added thereto.

Therefore, by separately providing the learning device 98c corresponding to a "virtual House of Councilors" that simulates the organization last involved in the legislation of laws, regulations, or standards, regardless of whether the legislative system is a unicameral system, a bicameral system, or any other system, it is possible to design input/output parameters that take into consideration the unique legislative situation of each country, and the prediction accuracy of the revision trends (i.e. the intermediate progress and final results) can be correspondingly increased.

Figure 13:
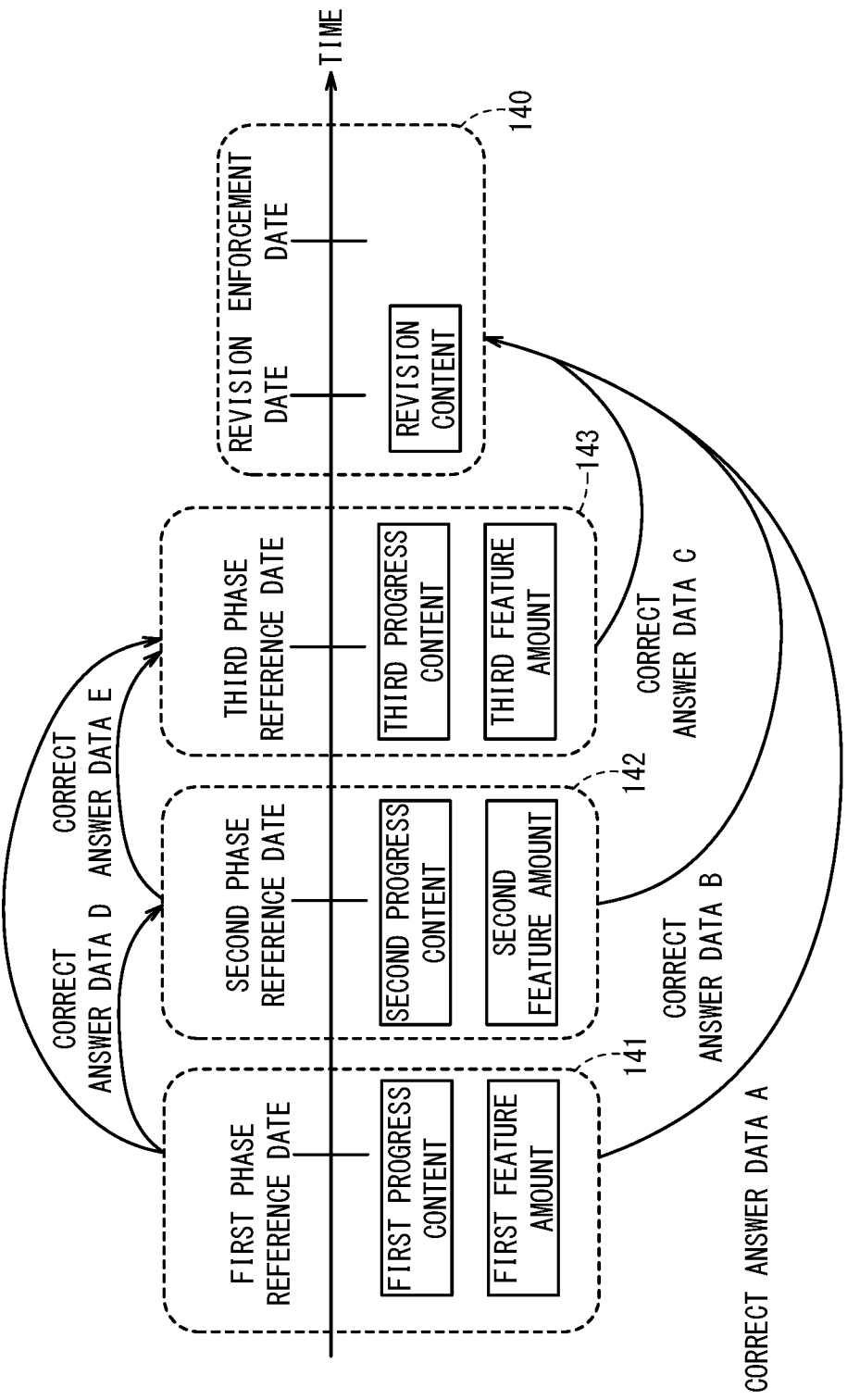
FIG. 13 shows an example of creation of learning data provided in a learning process.

FIG. 13 shows an example of the creation of learning data provided in the learning process. More specifically, this drawing is a time series diagram showing a method for creating a series of pieces of correct answer data (teacher data) based on the history of revisions that have actually occurred. For convenience of description, it is assumed that the revision of a law, regulation, or standard is performed through three phases (a first phase to a third phase).

For example, it is assumed that each of [1] a data set 140 made up of the actual revision date, enforcement date, and revision content, [2] a data set 141 made up of a reference date of the start of the first phase, first progress content, and a first feature amount, [3] a data set 142 made up of a reference date of the start of the second phase, second progress content, and a second feature amount, and [4] a data set 143 made up of a reference date of the start of the third phase, third progress content, and a third feature amount is acquired.

In this case, it is possible to use, as the learning data concerning the overall inference engine 80, [A] correct answer data in which the data set 141 is input and the data set 140 is output, [B] correct answer data in which the data set 142 is input and the data set 140 is output, and [C] correct answer data in which the data set 143 is input and the data set 140 is output.

It is possible to use, as the learning data for the learning device 98a, [D] correct answer data in which the data set 141 is input and a portion of the data set 142 (second phase reference date and second progress content) is output. It is possible to use, as the learning data for the learning device 98b, [E] correct answer data in which the data set 142 is input and a portion of the data set 143 (third phase reference date and third progress content) is output. It is possible to use, as the learning data for the learning device 98c, [F] correct answer data in which the data set 143 is input and the data set 140 is output.

In the manner described above, the revision predicting unit 74 can maintain a high prediction accuracy that is up-to-date with the newest revision situation by spontaneously performing the learning process described above whenever a revision of a law, regulation, or standard is determined.

<Step S4: Revision Trend Prediction Process>

At step S4 in FIG. 5, the legal information processing system 10 performs the revision trend prediction process.

Specifically, after receiving prediction instructions automatically or manually, the information processing server 20 predicts the revision trend (intermediate progress or final result) of a law, regulation, or standard.

First, the details a first prediction process of the revision trend performed by the information processing server 20 are described, while referencing the flow chart of FIG. 14 and FIG. 15.

At step S41 of FIG. 14, the information processing server 20 (second calculating section 34) reads the necessary information from the first storage apparatus 22.

At step S42, the second calculating section 34 designates analysis target information that has not yet been designated from among the various types of information read at step S41.

At step S43, the filter processing unit 70 performs a filtering process that removes some or all of the analysis target information designated at step S42. Specifically, the filter processing unit 70 quantifies the relevance to the enactment content of laws, regulations, or standards using the containment rate of related keywords, for example, and excludes locations where this obtained value (i.e. the relevance) is less than a threshold value.

Then, the filter processing unit 70 references the various types of information associated with the analysis target information, and extracts the enactment content closest to this analysis target information. The filter processing unit 70 generates legal syntax level information capable of being compared to the extracted enactment content, by reconstructing the analysis target information after the filter process.

At step S44, the matching information extracting unit 72 extracts matching information from the legal syntax level information constructed by the filter process of step S43. This "matching information" means information indicating matching points or differing points in the interpretation between the enactment content of the law, regulation, or standard and the public content (i.e. legal syntax level information) indicated by the public information F2. For the private information F3, the "matching information" means information indicating matching points or differing points in the interpretation between the enactment content of the law, regulation, or standard and the content (legal syntax level information) indicated by the private information F3.

For example, in the case of a law, matching points (differing points) in the subject, object, time, or procedure content can each correspond to the matching information. More specifically, the matching information corresponds to a "numerical value" if the reference value (upper limit value or lower limit value) or the reference range is different, and the matching information corresponds to a "range" if the application range is different.

Furthermore, the matching information may be a quantitative value indicating the degree of matching of two items, e.g. a "correlation coefficient". This correlation coefficient is a value normalized in a range from 0 to 1, is "1" when there is a perfect match, and is less than 1 by an amount according to the degree of difference when the items differ.

At step S45, the revision predicting unit 74 (inference engine 80) performs a prediction process concerning the revision trend of a law, regulation, or standard, using the matching information extracted at step S44. Specifically, the revision predicting unit 74 may predict the revision trend of a law, regulation, or standard, using the matching information extracted by the matching information extracting unit 72. The amount of input information is reduced by using the matching points or differing points in the interpretation, and the information processing amount for the prediction is decreased by a corresponding amount.

Furthermore, the revision predicting unit 74 may predict the degree of realization using at least one of the frequency of publication and number of publications of the public information F2, the degree of influence of the key person, the domestic or foreign revision history, and the history of handling a revision within a prescribed organization. For the private information F3, the degree of realization may be predicted using at least one of the degree of influence of the key person, the domestic or foreign revision history, and the history of handling a revision within a prescribed organization.

At step S46, the second calculating section 34 temporarily stores the prediction result obtained at step S45, i.e. the information (referred to below as revision prediction information) obtained by predicting the revision trend of the law, regulation, or standard, in the second storage section 36.

At step S47, the revision predicting unit 74 determines whether the prediction process has been finished for all of the analysis target information read at step S41. If the prediction process is not yet finished (step S47: NO), the process returns to step S42 and another piece of analysis target information that has not yet been processed is designated, and then the prediction process continues while the steps S42 to S47 are repeated. On the other hand, if the entire prediction process has been finished (step S47: YES), the process moves to step S48.

At step S48, the prediction result output unit 76 creates a revision prediction list F4 by selecting the prediction results sequentially stored at step S46. The revision prediction list F4 is a list including revision content having a relatively high degree of realization.

FIG. 15 visually shows an example of the revision prediction list F4 of FIG. 2. This revision prediction list F4 is table data made up of the classification category, title, date of publication (in the case of the private information F3, the date of acquisition), revision period, enforcement period, revision content, degree of realization, and status, for example.

As an example, for information for which the revision has already been determined, a value of "100" (in units of percentage) is stored as the degree of realization and a value of "determined" is stored as the status. On the other hand, for information for which the revision has not yet been determined, a value less than 100 is stored as the degree of realization and a value of "predicted" is stored as the status. Here, information for which realization cannot be completely denied (i.e. information for which the degree of realization is greater than or equal to 1) is provided as an example, but the threshold value for selection may be set to be variable.

In this way, the prediction result output unit 76 selects the prediction results of the revision predicting unit 74 according to the degree of realization to create the revision prediction list F4 including the revision content with a high degree of realization, and therefore it is possible to obtain highly comprehensive revision prediction information including the prediction information in which the degree of realization for the revisions is high.

At step S49, the information processing server 20 (second calculating section 34) transmits the revision prediction list F4 created at step S48 to the second storage apparatus 24, via the second communicating section 32. After receiving the revision prediction list F4, the second storage apparatus 24 updates the database that accumulates the revision prediction information. In this way, the operation (information processing) of the information processing server 20 is completed.

After this, a user (e.g. a staff member in the department 40) displays the content shown in FIG. 15 in a display 43 of the PC 42, by performing a prescribed manipulation to read the revision prediction list F4 stored in the second storage apparatus 24. In this way, the user can understand at a glance the prediction results of the revision trends, and can utilize this revision prediction information for work related to certification or regulation.

Figure 16:
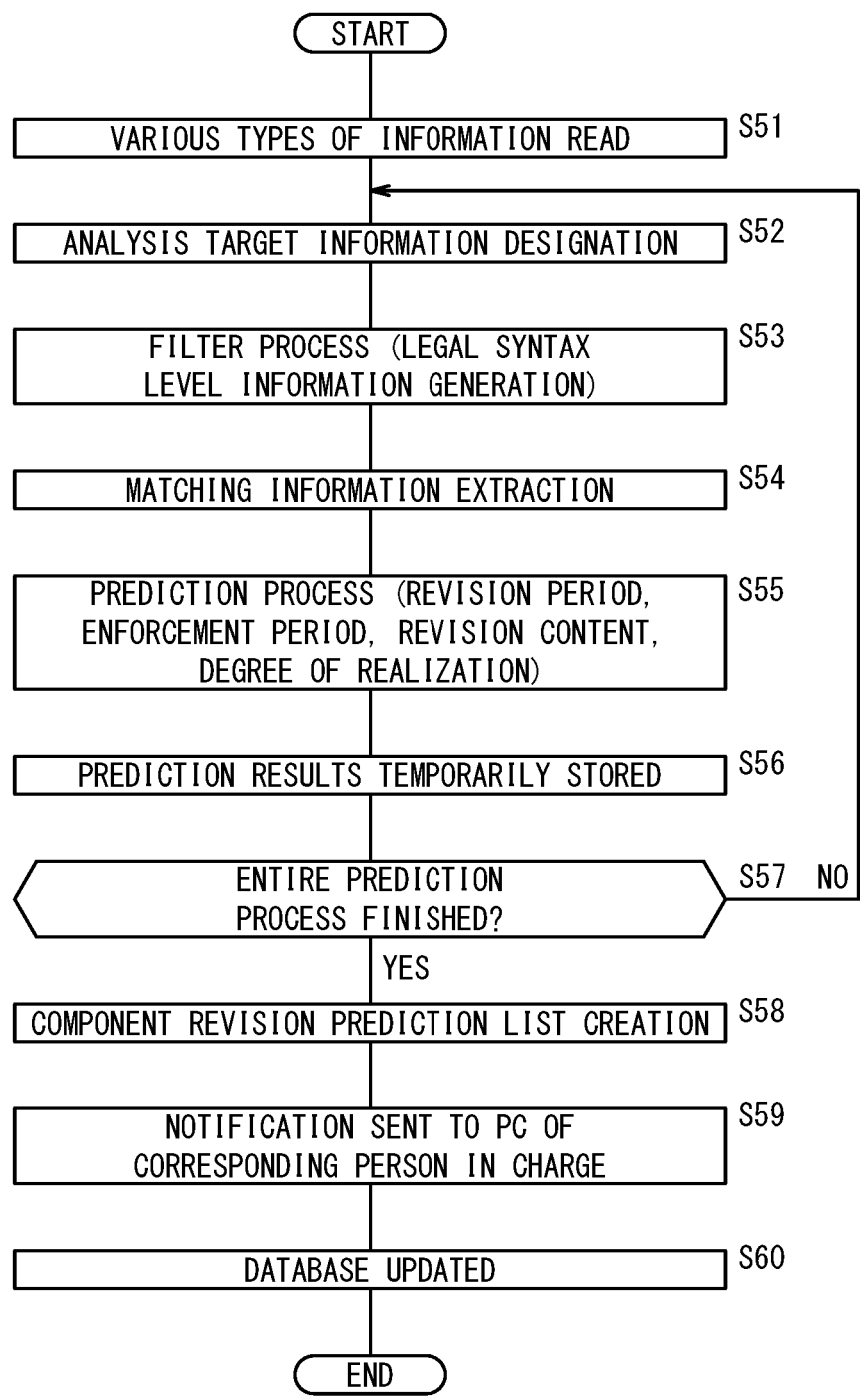
FIG. 16 is a detailed flow chart concerning a second prediction process (step S4 of FIG. 5) of the revision trend performed by the information processing server.

The following describes the details of a second prediction process of a revision rend performed by the information processing server 20, while referencing the flow chart of FIG. 16 and FIG. 17.

At step S51 of FIG. 16, the information processing server 20 (second calculating section 34) reads the necessary information, e.g. information of a legal component comparison database D5 (see FIG. 17) corresponding to a product name input by an operator, from the first storage apparatus 22.

The information of the legal component comparison database D5 is prepared for each product as shown in FIG. 17, for example, and a component name used for the product, an ID of a person in charge of a component corresponding to the component name (ID of a developer of the component, ID of a person in charge of purchasing the component, or the like), and types of laws, regulations, and standards for the component corresponding to the component name are registered in each record. Here, ID="001", law name="law 1", regulation name="regulation 1", and standard name="standard 1", for example, correspond to the component name "component 001", for example, and ID="002", law name="law 1", regulation name="regulation 2", and standard name="standard 1", for example, correspond to the component name "component 011", for example.

At step S52, the second calculating section 34 designates a piece of analysis target information (component name) that has not yet been designated, from within the information of the legal component comparison database D5 read at step S51.

At step S53, in the same manner as in step S43 described above, the filter processing unit 70 performs the filter process that removes some or all of the analysis target information designated at step S52. Furthermore, the filter processing unit 70 generates the legal syntax level information capable of being compared to the extracted enactment content, by reconstructing the analysis target information after the filter process.

At step S54, in the same manner as in step S44 described above, the matching information extracting unit 72 extracts the matching information from the legal syntax level information constructed by the filter process of step S53.

At step S55, in the same manner as in step S45 described above, the revision predicting unit 74 (inference engine 80) performs the prediction process concerning the revision trend of the law, regulation, or standard using the matching information extracted at step S54.

At step S56, in the same manner as in step S46 described above, the second calculating section 34 temporarily stores the prediction result obtained at step S55, i.e. the information (referred to below as revision prediction information) obtained by predicting the revision trend of the law, regulation, or standard, in the second storage section 36.

At step S57, in the same manner as in step S47 described above, the revision predicting unit 74 determines whether the prediction process has been finished for all of the analysis target information read at step S52. If the prediction process is not yet finished for the product name registered in the legal component comparison database D5 (step S57: NO), the process returns to step S52 and another piece of analysis target information (product name) that has not yet been processed is designated, and then the prediction process continues while the steps S52 to S57 are repeated. On the other hand, if the entire prediction process has been finished (step S57: YES), the process moves to step S58.

At step S58, the prediction result output unit 76 creates a component revision prediction list F5 (see FIG. 18) by selecting the prediction results sequentially stored at step S56. The component revision prediction list F5 is a list including revision content predicted for components predicted to be revised.

FIG. 18 visually shows an example of the component revision prediction list F5. This component revision prediction list F5 is table data made up of the component name, ID of a person in charge within the company, date of publication (in the case of the private information F3, the date of acquisition), revision period, enforcement period, revision content, degree of realization, and status, for example.

In the same manner as the revision prediction list F4 described above, in the component revision prediction list F5, for information for which the revision has already been determined, a value of "100" (in units of percentage) is stored as the degree of realization and a value of "determined" is stored as the status. On the other hand, for information for which the revision has not yet been determined, a value less than 100 is stored as the degree of realization and a value of "predicted" is stored as the status.

Further, at step S59, the prediction result output unit 76 notifies the PC 42 (terminal) of the person in charge within the company of the component corresponding to the component name about the revision prediction result for this component, based on the ID recorded in the component revision prediction list F5. For example, the prediction result output unit 76 outputs the component name, date of publication (in the case of the private information F3, the date of acquisition), revision period, enforcement period, revision content, degree of realization, and status from the component revision prediction list F5, to provide the notification about the revision prediction result of this component. The PC that has received this revision prediction result displays the revision prediction result in the display 43 connected to this PC.

At step S60, the second calculating section 34 transmits the component revision prediction list F5 created at step S58 to the second storage apparatus 24, via the second communicating section 32. After receiving the component revision prediction list F5, the second storage apparatus 24 updates the database that accumulates the revision prediction information. In this way, the operation (information processing) of the information processing server 20 is completed.

[Overall Configuration of the Information Network (Part 2)]

Figure 19:
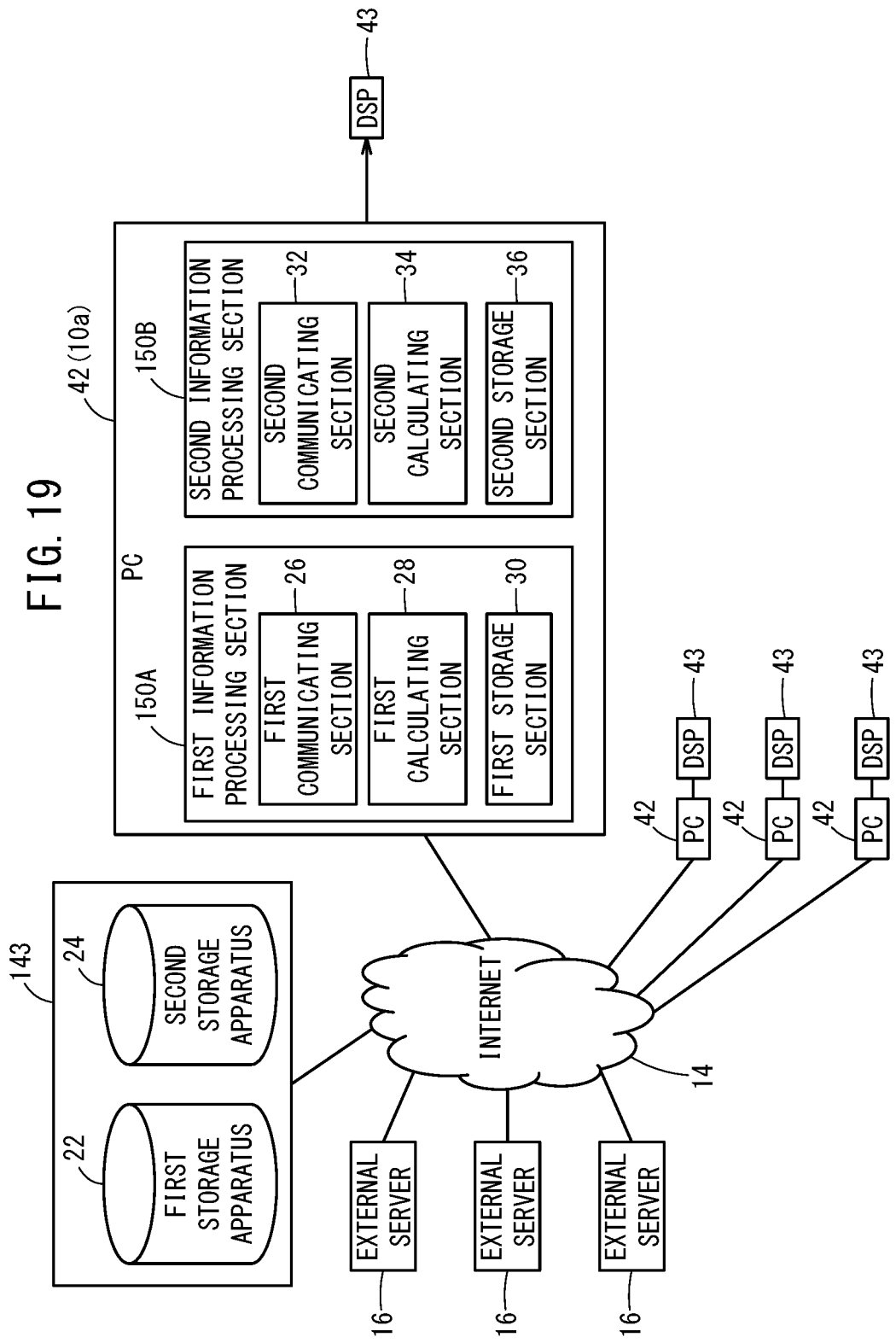
FIG. 19 is an overall configurational diagram of an information network including a legal information processing system according to a modification.

The legal information processing system 10 described above has a configuration in which the information gathering server 18, the information processing server 20, the relay apparatus 41 of the department 40, and the relay apparatus 45 of the department 44 are connected to each other via the LAN 38 constructed in the intranet 12, but may instead be configured as a legal information processing system 10*a* according to the modification shown in FIG. 19.

In other words, as shown in FIG. 19, a plurality of PCs 42 connected to one or more external servers 16 via the Internet 14 may be included, and each PC 42 may form the legal information processing system 10*a*. In this case, each PC 42 functions as a client terminal for the one or more external servers 16. Furthermore, each PC 42 is connected via the Internet 14 to a cloud server 143 in which the first storage apparatus 22 and the second storage apparatus 24 are provided.

Each PC 42 includes at least two information processing sections (a first information processing section 150A and a second information processing section 150B) and the display 43. Among these, the first information processing section 150A includes the first communicating section 26, the first calculating section 28, and the first storage section 30, and the second information processing section 150B includes the second communicating section 32, the second calculating section 34, and the second storage section 36.

In this case as well, the first communicating section 26 and the second communicating section 32 are interfaces that transmit and receive electric signals to and from external apparatuses. The first calculating section 28 and the second calculating section 34 are formed of process computing apparatuses including CPUs and MPUs. The first storage section 30 and the second storage section 36 are non-transitory and are formed of computer-readable storage mediums.

In this legal information processing system 10*a*, the legal information processing described above is performed in each PC 42. Among these PCs 42, the PC 42 of the person within the company in charge of a component corresponding to a component name recorded in the component revision prediction list F5 is notified about the revision prediction information of this component, and this revision prediction information is displayed in the display 43 connected to this PC 42.

In this legal information processing system 10*a*, the process of gathering the official documents, the process of gathering the public information and the private information, the learning process of the inference engine, and the revision trend prediction process are implemented by each PC 42, in the same manner as the legal information processing system 10 described above, but a portion of the revision trend prediction process is different.

Specifically, at step S61 of FIG. 20, the PC (second calculating section 34) reads the necessary information, e.g. information of the legal component comparison database D5 (see FIG. 17) corresponding to the product name input by the operator, from the first storage apparatus 22.

At step S62, the second calculating section 34 extracts only the information (indicated as secondary information) corresponding to the component name corresponding to the ID of the person within the company in charge of this PC, from the information of the legal component comparison database D5 read at step S61.

At step S63, the second calculating section 34 designates a piece of analysis target information (component name) that has not yet been designated, from the secondary information extracted at step S62.

After this, at steps S64 to S67, the processing is performed in the same manner as in steps S53 to S56 of FIG. 16 described above, and the second calculating section 34 temporarily stores the information (revision prediction information) obtained by predicting the revision trends of the laws, regulations, or standards, in the second storage section 36.

At step S68, in the same manner as in step S57 described above, the revision predicting unit 74 determines whether the prediction process has been finished for all of the analysis target information designated at step S63. If the prediction process is not yet finished for the product name registered in the secondary information extracted at step S62 (step S68: NO), the process returns to step S63 and another piece of analysis target information (secondary information) that has not yet been processed is designated, and then the prediction process continues while the steps S63 to S68 are repeated. On the other hand, if the entire prediction process has been finished (step S68: YES), the process moves to step S69.

At step S69, the prediction result output unit 76 creates the component revision prediction list F5 (see FIG. 18) by selecting the prediction results sequentially stored at step S56.

Further, at step S70, the prediction result output unit 76 notifies the PC 42 of the person in charge within the company about the revision prediction results recorded in the component revision prediction list F5. The PC 42 that has received the revision prediction results displays these revision prediction results in the display 43 connected to this PC 42.

At step S71, the second calculating section 34 transmits the component revision prediction list F5 created at step S69 to the second storage apparatus 24, via the second communicating section 32. After receiving the component revision prediction list F5, the second storage apparatus 24 updates the database that accumulates the revision prediction information. In this way, the operation (information processing) of the information processing server 20 is completed.

[Effects of the Legal Information Processing System, Method, and Non-Transitory Computer-Readable Storage Medium Storing Program]

[1] The legal information processing system 10 according to the present embodiment comprises a key person setting section (key person setting unit 50) that sets one or more key people that are related people related to a law, regulation, or standard; an information gathering section (information gathering unit 52) that gathers at least public information (F1, F2), the key person set by the key person setting section 50 being involved in creating or publishing the public information (F1, F2); and a revision predicting section (revision predicting unit 74) that predicts a revision trend of the law, regulation, or standard based on content of the information gathered by the information gathering section 52.

In this way, by setting one or more key people that are people related to the law, regulation, or standard and gathering at least the public information, it is possible to predict, with a high degree of certainty, the revision of a law, regulation of standard based on the information, the source of which is reliable and which is related with the revision, and to obtain useful information anticipating this revision trend.

[2] The present embodiment further comprises a specific information acquiring section (specific information acquiring module 62) that acquires date information associated with at least the public information gathered by the information gathering section 52, wherein the revision predicting section 74 predicts the revision trend of the law, regulation, or standard by further using the date information acquired by the specific information acquiring section 62. In this way, the reliability of the public information due to the time stamp can be further guaranteed, and therefore the certainty of the prediction is further increased.

[3] The present embodiment further comprises an information classifying section (legal syntax classifying module 63, analysis target classifying module 68) that classifies information in prescribed syntax units obtained by parsing at least the public information, into each category of the law, regulation, and standard, wherein the revision predicting section 74 predicts the revision trend of the law, regulation, or standard for each category into which the information is classified by the information classifying section (63, 68). In this way, even in a case where various contents are included in one unit of public information and private information, it is possible to efficiently organize information and predict revisions according to predetermined classification categories.

[4] In the present embodiment, the revision predicting section 74 predicts at least one of a revision period, an enforcement period, revision content, and a degree of realization. In this way, it is possible to obtain information that is useful for business activities including research and development.

[5] In the present embodiment, the revision predicting section 74 further predicts the degree of realization using at least one of a publication frequency and a number of publications of the public information, a degree of influence of the key person, a domestic or foreign revision history, and a history of handling a revision within a prescribed organization. In this way, it is possible to obtain highly comprehensive revision prediction information including prediction information for which the degree of realization of the revision is relatively high.

[6] The present embodiment further comprises a prediction list creating section (prediction result output unit 76) that selects prediction results of the revision predicting section 74 according to the degree of realization and creates a revision prediction list F4 including the revision content having the degree of realization that is relatively high. In this way, it is possible to obtain highly comprehensive revision prediction information including prediction information for which the degree of realization of the revision is relatively high.

[7] In the present embodiment, the revision predicting section 74 includes at least one learning device (98c) that simulates an organization involved in legislation of the law, regulation, or standard, and at least the learning device (98c) simulates an organization last involved in the legislation of the law, regulation, or standard, regardless of whether a legislative system is a unicameral system, a bicameral system, or another system. In this way, it is possible to design input/output parameters that take into consideration the unique legislative situation of each country, and the prediction accuracy of the revision trend is correspondingly increased.

[8] In the present embodiment, the revision predicting section 74 includes a plurality of learning devices (98a, 98b) that simulate an organization involved in legislation of the law, regulation, or standard, and simulate an organizational structure involved in the legislation of the law, regulation, or standard. In this way, it is possible to design input/output parameters that take into consideration the unique legislative situation of each country, and the prediction accuracy of the revision trend is correspondingly increased.

[9] The present embodiment further comprises a matching information extracting section (matching information extracting unit 72) that extracts matching information indicating matching points or differing points in interpretation between public content and enactment content of the law, regulation, or standard, wherein the revision predicting section 74 predicts the revision trend of the law, regulation, or standard by further using the matching information extracted by the matching information extracting section 72. In this way, by using the matching points and differing points in interpretation, the amount of input information is reduced, and the information processing amount for the prediction is reduced by a corresponding amount.

[10] In the present embodiment, the specific information acquiring section 67 further acquires related person information capable of specifying a related person associated with the public information, separately from the key person involved in creating or publishing the public information, and the key person setting section 50 newly sets, as the key person, the related person specified by the related person information. In this way, it is possible to automatically compensate for missing key person settings, using the related person information acquired through the public information.

[11] In the present embodiment, the key person setting section 50 sets a national or regional supervisory authority as the key person, and the information gathering section 52 gathers the public information capable of being used by an electronic public notice of the supervisory authority.

The public information usable by the electronic public notice of the supervisory authority is one type of information that is important for understanding the revision trends through the establishment history of laws, regulations, or standards in a country or region. Therefore, it is possible to further increase the prediction accuracy of the revision by using this information.

[12] In the present embodiment, the information gathering section 52 gathers, as the public information, an official document published based on a patent system or similar system, with the key person being an inventor or applicant thereof under law.

Documents published under the patent system or a similar system are one form of information that is important for understanding the revision trends through disclosed technological problems. Therefore, it is possible to further increase the prediction accuracy of the revision by using this information.

[13] In the present embodiment, the key person setting section 50 sets, as the related person, a stakeholder in the law, regulation, or standard. A stakeholder has a greater influence on revisions than an ordinary related person, and is therefore suitable as a key person.

[14] The legal information processing system 10a according to the present embodiment is formed of one or more computers and a client terminal apparatus 42 that is installed domestically or in a foreign country and provides notification about at least the revision trend of the law, regulation, or standard predicted by the revision predicting section 74, and the client terminal apparatus 42 accesses, domestically or from the foreign country, the revision trend of the law, regulation, or standard predicted by the revision predicting section 74 based on at least public content indicated by the public information.

In this way, instead of needing to hold all of the information relating to a large number of components forming one product, for example, it is only necessary to hold information relating to some components, e.g. components (specific components) managed by the department where the client terminal apparatus 42 is installed. As a result, in each client terminal apparatus 42, since it is only necessary to calculate a revision prediction for each corresponding specific component, it is possible to shorten the calculation time until the revision prediction results can be obtained, and the person in charge or the like in each department can quickly know the revision prediction of the component he or she is in charge of.

[15] In a legal information processing method according to the present embodiment, one or more computers execute a key person setting step of setting one or more key people that are related people related to a law, regulation, or standard; an information gathering step of gathering at least public information, the set key person being involved in creating or publishing the public information; and a predicting step of predicting a revision trend of the law, regulation, or standard based on content of the gathered information.

In this way, by setting one or more key people that are people related to the law, regulation, or standard and gathering the public information, it is possible to predict, with a high degree of certainty, the revision of a law, regulation of standard based on the information, the source of which is reliable and which is related with the revision, and to obtain useful information anticipating this revision trend.

[16] Furthermore, a legal information processing method according to the present embodiment comprises a key person setting step of setting one or more key people that are related people related to a law, regulation, or standard; an information gathering step of gathering at least public information, the set key person being involved in creating or publishing the public information; and a predicting step of predicting a revision trend of the law, regulation, or standard based on content of the gathered information, the method, while causing one or more computers to execute the above steps, handling the public information or private information, the one or more ordinary key people or a key person related to product development in his or her own company being involved in creating or publishing the public information or the private information, the legal information processing method comprising an information classifying step of classifying information in prescribed syntax units obtained by parsing the public information or the private information, into each category of the law, regulation, or standard; and a matching information extracting step of extracting matching information indicating matching points or differing points in interpretation between enactment content of the law, regulation, or standard and a development category of a product, the legal information processing method further comprising a step of providing notification about content of a current law, regulation, or standard requiring revision corresponding to a development category of the product, the content being the matching information extracted in the matching information extracting step, in a case where the development category of the product is input as the public information or the private information.

In this way, the user of the legal information processing system can lobby to authorities in developing countries and see changing in laws and the like, for example.

For example, in a case where there is a concern that if "developing technology" would be "against the law" if used as-is according to a current "law, regulation, or standard", it is possible to which "law, regulation, or standard" should be revised.

There are cases where developing countries try to incorporate the laws of advanced countries concerning automobiles and try to change the laws to those of advanced countries as they are. In such cases, it is sometimes expected that there will be confusion because the laws of advanced countries are adopted too quickly in consideration of the road conditions in the developing country, for example. At this time, industry associations, industry leaders in developed countries, and the like can carry out public relations (lobbying) to the authorities in the developing countries to propose delays in the enforcement of the law or propose alternative legislation.

[17] In a legal information processing method according to the present embodiment, one or more computers execute a key person setting step of setting one or more key people that are related people related to a law, regulation, or standard; an information gathering step of gathering at least public information, the set key person being involved in creating or publishing the public information; and a predicting step of predicting a revision trend of the law, regulation, or standard based on content of the gathered information, the information processing method comprising a specific information acquiring step of acquiring date information associated with the information gathered in the information gathering step; and an information classifying step of classifying information in prescribed syntax units obtained by parsing the information, into each category of the law, regulation, or standard, wherein the one or more computers include a legal component comparison database in which, for each component unit of a product regulated by a law, regulation, or standard, a category of the law, regulation, or standard corresponding to the component is assigned, the predicting step includes predicting a revision trend of the law, regulation, or standard for each category into which the information is classified in the information classifying step, by further using the date information acquired in the specific information acquiring step, for the revision trend, at least one of a revision period, an enforcement period, revision content, and a degree of realization is predicted, and for the revision trend, the degree of realization is predicted by further using at least one item from among at least a publication frequency and a number of publications of the public information, a degree of influence of the key person, a domestic or foreign revision history, and a history of handling a revision within a prescribed organization, the legal information processing method further causing the one or more computers to execute a prediction list creating step of selecting prediction results obtained in the predicting step according to the degree of realization and creating a revision predicting list including the revision content having the degree of realization that is relatively high; a component specifying step of, correspondingly to a classification category assigned to the revision content recorded in the revision predicting list, specifying the product and component to be adapted to the revision content by using the legal component comparison database; and a notification step of notifying a person within a company (a developer, component purchasing personal, and the like) in charge of a component to be adapted to the revision content about at least a revision period, an enforcement period, revision content, and a component to be adapted, based on the history of handling the revision within the prescribed organization.

In this way, it is possible to provide a regulatory alert service. A regulatory alert is to provide notification of at least the revision period, enforcement period, revision content, and the component that is to be adapted to the revision content, to a person within a company (for example, a developer, component purchasing personnel, and the like) in charge of the component to be adapted.

Specifically, the service shown below can be provided.

In a situation of "reporting the schedule for changing the regulations to the person in charge in the purchasing department", even if only "change content of the regulations change" is communicated, if not specifically informed about "which component with what number" is "changed in what way?", there is a problem that it is impossible to respond.

Therefore, information concerning "a classification category assigned to the revision content, a component (component number) to be adapted to the revision content, and a history of handling a revision within a prescribed organization" acquired from the "legal component comparison database in which, for each component unit of a product regulated by this law, regulation, or standard, a category of the law, regulation, or standard corresponding to the component is assigned" is used as the input information.

"At least a revision period, an enforcement period, revision content, and a component to be adapted (component number)" is output to "a person within the company (a developer, component purchasing personal, and the like) in charge of the component that is to be adapted to the revision content" as the output information.

As the service, it is possible to notify the person within the company (example: a developer, component purchasing personal, and the like) in charge of the component that is to be adapted to the revision content about "at least the revision period, enforcement period, revision content, and the components to be adapted". For example, an alert such as "from this enforcement date, this component can no longer be used" can be output.

[18] A non-transitory computer-readable storage medium storing a legal information processing program according to the present embodiment causes one or more computers to execute a key person setting step of setting one or more key people that are related people related to a law, regulation, or standard; an information gathering step of gathering at least public information, the set key person being involved in creating or publishing the public information; and a predicting step of predicting a revision trend of the law, regulation, or standard based on content of the gathered information.

In this way, by setting one or more key people who are people related to the law, regulation, or standard and gathering the public information F2, it is possible to predict, with a high degree of certainty, the revision of a law, regulation of standard based on the public information F2, the source of which is reliable and which is related with the revision, and to obtain useful information anticipating this revision trend.

[Remarks]

The present invention is not limited to the above-described embodiment, and it goes without saying that various modifications could be adopted therein without departing from the essence and gist of the present invention. Alternatively, any of the above configurations may be combined, as long as this combination does not cause a technical contradiction.

The invention claimed is:

1. A legal information processing system comprising a processor that executes computer-executable instructions that cause the processor to act as:
   a key person setting section configured to set one or more key people that are related people related to a law, regulation, or standard;
   an information gathering section configured to gather at least public information including a history of revisions to the law, regulations, or standard, the key person set by the key person setting section being involved in creating or publishing the public information; and
   a revision predicting section configured to predict a revision trend of the law, regulation, or standard with a neural network based inference engine that has undergone a learning process based on learning data and a parameter updating section, the learning data is content of the public information including the history of revisions, the public information being gathered by the information gathering section and the parameter updating section updates each value of a parameter group in a manner to decrease an error generated by a comparison of an actual output value of the inference engine with an idealized output value of the inference engine, wherein
   the legal information processing system handles the public information or private information with one or more computers, wherein general key people out of the one or more key people, or a key person related to product development in his or her own company is involved in creating or publishing the public information or the private information,
   the legal information processing system further comprising:
   an information classifying unit that classifies information in prescribed syntax units obtained by parsing the public information or the private information, into each category of the law, regulation, or standard; and
   a matching information extracting unit that extracts matching information indicating matching points or differing points in interpretation between enactment content of the law, regulation, or standard and a development category of a product, and
   a client terminal apparatus that provides notification about content of a current law, regulation, or standard requiring revision corresponding to a development category of the product, the content being the matching information extracted in the matching information extracting step, in a case where the development category of the product is input as the public information or the private information,
   the revision predicting section includes
   a feature amount generating module that generates one or more feature amounts to be provided in the learning process of the inference engine, and
   a learning process module that controls the learning process of the inference engine and includes a learning data generating section and a parameter updating section that reference a history of revisions that have actually occurred and generate the learning data, and
   wherein a determination that a revision of the law, regulation, or standard has occurred automatically triggers performance of the learning process with the learning process module.

2. The legal information processing system according to claim 1, further comprising:
   a specific information acquiring section configured to acquire date information associated with at least the public information gathered by the information gathering section, wherein
   the revision predicting section predicts the revision trend of the law, regulation, or standard by further using the date information acquired by the specific information acquiring section.

3. The legal information processing system according to claim 2, wherein
   the revision predicting section predicts the revision trend of the law, regulation, or standard for each category into which the information is classified by the information classifying section.

4. The legal information processing system according to claim 3, wherein
   the revision predicting section predicts at least one of a revision period, an enforcement period, revision content, and a degree of realization.

5. The legal information processing system according to claim 4, wherein the revision predicting section further predicts the degree of realization using at least one of a publication frequency and a number of publications of the public information, a degree of influence of the key person, a domestic or foreign revision history, and a history of handling a revision within a prescribed organization.

6. The legal information processing system according to claim 4, further comprising:
a prediction list creating section configured to select prediction results of the revision predicting section according to the degree of realization and create a revision prediction list including the revision content having the degree of realization that is relatively higher than other revision content.

7. The legal information processing system according to claim 1, wherein
the revision predicting section includes at least one learning device configured to simulate an organization involved in legislation of the law, regulation, or standard, and
at least the learning device simulates an organization last involved in the legislation of the law, regulation, or standard, regardless of whether a legislative system is a unicameral system, a bicameral system, or another system.

8. The legal information processing system according to claim 1, wherein
the revision predicting section includes a plurality of learning devices configured to simulate an organization involved in legislation of the law, regulation, or standard, and simulate an organizational structure involved in the legislation of the law, regulation, or standard.

9. The legal information processing system according to claim 2, wherein
the specific information acquiring section further acquires related person information configured to specify a related person associated with the public information, separately from the key person involved in creating or publishing the public information, and
the key person setting section newly sets, as the key person, the related person specified by the related person information.

10. The legal information processing system according to claim 1, wherein
the key person setting section sets a national or regional supervisory authority as the key person, and
the information gathering section gathers the public information configured to be used by an electronic public notice of the supervisory authority.

11. The legal information processing system according to claim 1, wherein
the information gathering section gathers, as the public information, an official document published based on a patent system or similar system, with the key person being an inventor or applicant thereof under law.

12. The legal information processing system according to claim 1, wherein
the key person setting section sets, as the related person, a stakeholder in the law, regulation, or standard.

13. The legal information processing system according to claim 1, wherein
the one or more computers and the client terminal apparatus are installed domestically or in a foreign country and further configured to provide notification about at least the revision trend of the law, regulation, or standard predicted by the revision predicting section, and
the client terminal apparatus accesses, domestically or from the foreign country, the revision trend of the law, regulation, or standard predicted by the revision predicting section based on at least public content indicated by the public information.

14. The legal information processing system according to claim 1, wherein the public information that includes the history revisions of the law, regulation, or standard created or published by the key person set by the key person setting section is public information concerning an automobile having the history of revisions of the law, regulation, or standard created or published by the key person set by the key person setting section.

15. A legal information processing method, wherein one or more computers execute:
a key person setting step of setting one or more key people that are related people related to a law, regulation, or standard;
an information gathering step of gathering at least public information including a history of revisions to the law, regulations, or standard, the set key person being involved in creating or publishing the public information; and
a predicting step of predicting a revision trend of the law, regulation, or standard with a neural network based inference engine that has undergone a learning process based on learning data and parameter updating, the learning data is content of the gathered public information including the history of revisions and the parameter updating includes updates to each value of a parameter group in a manner that decreases an error generated by a comparison of an actual output value of the inference engine with an idealized output value of the inference engine, wherein
while the one or more computers execute the key person setting step, the information gathering step, and the predicting step, the legal information processing method handles the public information or private information wherein general key people out of the one or more key people, or a key person related to product development in his or her own company being involved in creating or publishing the public information or the private information, and
the one or more computers execute
an information classifying step of classifying information in prescribed syntax units obtained by parsing the public information or the private information, into each category of the law, regulation, or standard; and
a matching information extracting step of extracting matching information indicating matching points or differing points in interpretation between enactment content of the law, regulation, or standard and a development category of a product, and
the one or more computers further execute a step of providing notification about content of a current law, regulation, or standard requiring revision corresponding to a development category of the product, the content being the matching information extracted in the matching information extracting step, in a case where the development category of the product is input as the public information or the private information,
the predicting step includes
a feature amount generating step that generates one or more feature amounts to be provided in the learning process of the inference engine, and
a learning process step that controls the learning process of the inference engine and includes a learning data generating step and a parameter updating step that reference a history of revisions that have actually occurred and generate the learning data, and automatically triggering performance of the learning process step upon a determination that a revision of the law, regulation, or standard has occurred.

16. The legal information processing system according to claim 15, wherein the public information that includes the history revisions of the law, regulation, or standard created or published by the key person set by the key person setting section is public information concerning an automobile having the history of revisions of the law, regulation, or standard created or published by the key person set by the key person setting section.

17. A legal information processing method in which one or more computers execute:

a key person setting step of setting one or more key people that are related people related to a law, regulation, or standard;

an information gathering step of gathering at least public information including a history of revisions to the law, regulations, or standard, the set key person being involved in creating or publishing the public information; and a predicting step of predicting a revision trend of the law, regulation, or standard with a neural network based inference engine that has undergone a learning process based on learning data and parameter updating, the learning data is content of the gathered public information including the history of revisions and the parameter updating includes updates to each value of a parameter group in a manner that decreases an error generated by a comparison of an actual output value of the inference engine with an idealized output value of the inference engine, the one or more computers further execute:

a specific information acquiring step of acquiring date information associated with the public information gathered in the information gathering step; and an information classifying step of classifying information in prescribed syntax units obtained by parsing the public information, into each category of the law, regulation, or standard, the one or more computers include a legal component comparison database in which, for each component unit of a product regulated by a law, regulation, or standard, a category of the law, regulation, or standard corresponding to the component is assigned, the predicting step includes predicting a revision trend of the law, regulation, or standard for each category into which the information is classified in the information classifying step, by further using the date information acquired in the specific information acquiring step, for the revision trend, at least one of a revision period, an enforcement period, revision content, and a degree of realization is predicted, and for the revision trend, the degree of realization is predicted by further using at least one item from among at least a publication frequency and a number of publications of the public information, a degree of influence of the key person, a domestic or foreign revision history, and a history of handling a revision within a prescribed organization, and wherein the one or more computers further execute:

a prediction list creating step of selecting prediction results obtained in the predicting step according to the degree of realization and creating a revision predicting list including the revision content having the degree of realization that is relatively higher than other revision content;

a component specifying step of, correspondingly to a classification category assigned to the revision content in the revision predicting list, specifying the product and component to be adapted to the revision content by using the legal component comparison database; and a notification step of notifying a person within a company in charge of a component to be adapted to the revision content in the revision predicting list about at least a revision period, an enforcement period, revision content, and a component to be adapted, based on the history of handling the revision within the prescribed organization, the predicting step includes a feature amount generating step that generates one or more feature amounts to be provided in the learning process of the inference engine, and a learning process step that controls the learning process of the inference engine and includes a learning data generating step and a parameter updating step that reference a history of revisions that have actually occurred and generate the learning data, and automatically triggering performance of the learning process step upon a determination that a revision of the law, regulation, or standard has occurred.

18. The legal information processing system according to claim 17, wherein the public information that includes the history revisions of the law, regulation, or standard created or published by the key person set by the key person setting section is public information concerning an automobile having the history of revisions of the law, regulation, or standard created or published by the key person set by the key person setting section.

* * * * *